United States Patent
Yamada et al.

(10) Patent No.: US 9,198,516 B2
(45) Date of Patent: Dec. 1, 2015

(54) OTTOMAN DEVICE

(71) Applicant: Aisin Seiki Kabushiki Kaisha, Kariya-shi (JP)

(72) Inventors: Yukifumi Yamada, Toyota (JP); Naoki Goto, Tokai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 206 days.

(21) Appl. No.: 13/867,337

(22) Filed: Apr. 22, 2013

(65) Prior Publication Data

US 2013/0285433 A1 Oct. 31, 2013

(30) Foreign Application Priority Data

Apr. 25, 2012 (JP) ................... 2012-100376

(51) Int. Cl.
*A47C 7/50* (2006.01)
*B60N 2/44* (2006.01)

(52) U.S. Cl.
CPC .............. *A47C 7/506* (2013.01); *B60N 2/4495* (2013.01)

(58) Field of Classification Search
CPC ............................. B60N 2/4495; A47C 7/506
USPC ........... 297/423.26, 423, 3, 69, 364, 365, 373
See application file for complete search history.

(56) References Cited

U.S. PATENT DOCUMENTS

| | | | |
|---|---|---|---|
| 3,328,079 A * | 6/1967 | Byczkowski et al. | 297/373 |
| 3,545,810 A * | 12/1970 | Anderson et al. | 297/373 |
| 6,095,610 A | 8/2000 | Okajima et al. | |
| 7,429,083 B2 * | 9/2008 | Tsuji et al. | 297/423.26 |
| 8,167,370 B2 * | 5/2012 | Arakawa et al. | 297/284.11 |
| 8,430,456 B2 * | 4/2013 | Nowak et al. | 297/423.3 |
| 2005/0012377 A1 * | 1/2005 | Ito | 297/423.26 |
| 2010/0052395 A1 * | 3/2010 | Anglese | 297/423.3 |

FOREIGN PATENT DOCUMENTS

| | | |
|---|---|---|
| EP | 0 960 766 A2 | 12/1999 |
| JP | 2006-198104 | 8/2006 |
| JP | 2009-240350 | 10/2009 |
| WO | WO 2006/011244 A1 | 2/2006 |

OTHER PUBLICATIONS

Extended Search Report issued Aug. 5, 2013 in European Patent Application No. 13165325.5.

* cited by examiner

*Primary Examiner* — David R Dunn
*Assistant Examiner* — Jody Giacoman
(74) *Attorney, Agent, or Firm* — Oblon, McClelland, Maier & Neustadt, L.L.P.

(57) ABSTRACT

An ottoman device includes a base bracket, a link mechanism supporting an ottoman and including a rotation link, engagement portions formed at facing surfaces that are provided at the rotation link and the base bracket respectively and engaging with each other to restrict a rotation of the rotation link, at least one of the engagement portions including an inclined surface serving as an engagement surface, a restriction portion restricting a relative axial movement between the rotation link and the base bracket in a direction in which the rotation link is separated from the base bracket in a load range where an engagement state between the engagement portions is maintainable, and an operation portion configured to change a relative position between the rotation link and the base bracket by moving the restriction portion in an axial direction of the rotation shaft.

11 Claims, 24 Drawing Sheets

Retracted direction

OTTOMAN DEVICE

CROSS REFERENCE TO RELATED APPLICATIONS

This application is based on and claims priority under 35 U.S.C. §119 to Japanese Patent Application 2012-100376, filed on Apr. 25, 2012, the entire content of which is incorporated herein by reference.

TECHNICAL FIELD

This disclosure generally relates to an ottoman device.

BACKGROUND DISCUSSION

According to a known ottoman device, an ottoman is supported at an end portion of a link mechanism provided and supported at a front edge of a seat. The ottoman is configured to be deployed to a front side of the seat or retracted to the seat based on an operation of the link mechanism.

For example, an ottoman device disclosed in JP2009-240350A includes a rotation transmission mechanism connecting a rotation link constituting a link mechanism, and an operation handle. A clutch mechanism is provided at the rotation transmission mechanism so as to allow a rotation transmission from the operation handle while prohibiting a rotation transmission from the rotation link. As a result, a deployed position of an ottoman is adjustable by the operation handle.

According to the aforementioned ottoman device disclosed in JP2009-240350A, for example, an excess load may be applied to the ottoman by an occupant seated on the ottoman or the occupant placing one knee on the ottoman, for example. In order to overcome such excess load input to the ottoman, strength of each of the link mechanism, the rotation transmission mechanism, and the clutch mechanism, for example, is enhanced, which may lead to an increase of a size or a weight of the ottoman device.

A need thus exists for an ottoman device which is not susceptible to the drawback mentioned above.

SUMMARY

According to an aspect of this disclosure, an ottoman device includes base bracket configured to be arranged at a front edge of a seat, a link mechanism supporting an ottoman and including a rotation link connected to the base bracket via a rotation shaft, the link mechanism selectively causing the ottoman to be deployed forward of the seat and to be retracted to the front edge of the seat based on a rotation of the rotation link, engagement portions formed at facing surfaces that are provided at the rotation link and the base bracket respectively and engaging with each other to restrict the rotation of the rotation link, each of the facing surfaces being formed at a peripheral edge of the rotation shaft, at least one of the engagement portions including an inclined surface serving as an engagement surface, a restriction portion restricting a relative axial movement between the rotation link and the base bracket in a direction in which the rotation link is separated from the base bracket in a load range where an engagement state between the engagement portions is maintainable, and an operation portion configured to change a relative position between the rotation link and the base bracket by moving the restriction portion in an axial direction of the rotation shaft.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
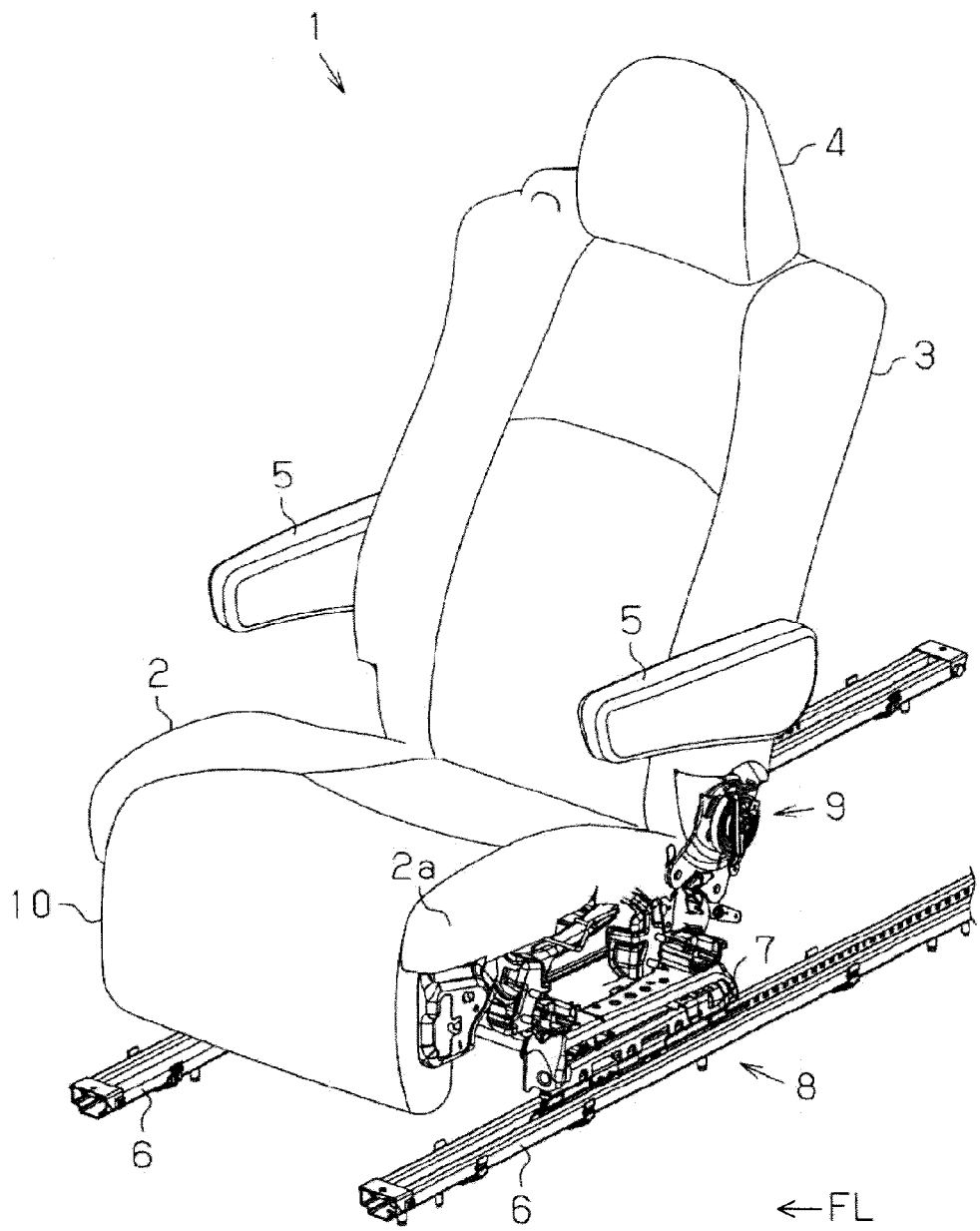
FIG. 1 is a perspective view of a seat including an ottoman device according to first and second embodiments disclosed here.

Embodiments will be explained with reference to the attached drawings. In the embodiments, directions and orientations such as left, right, front, rear, top, and bottom correspond to those when viewed from an occupant seated on a seat for a vehicle. According to a first embodiment as illustrated in FIG. 1, a seat 1 for a vehicle includes a seat cushion 2 and a seatback 3 provided at a rear end portion of the seat cushion 2 so as to be tiltable relative to the seat cushion 2. A headrest 4 is arranged at an upper end portion of the seatback 3. A pair of armrests 5 is provided at both ends of the seatback 3 in a width direction of the seatback 3, i.e., of the seat 1.

A pair of lower rails 6 is provided at a floor portion FL of the vehicle so as to be arranged side by side in the width direction of the seat 1. A pair of upper rails 7 is arranged on the pair of lower rails 6 so as to be slidable relative to the pair of lower rails 6. The seat cushion 2 of the seat 1 is fixed onto the upper rails 7.

According to the present embodiment, a seat slide apparatus 8 is constituted by the lower rails 6 and the upper rails 7. An occupant of the vehicle may adjust a position of the seat 1 in a front-rear direction, i.e., in a longitudinal direction, of the vehicle by means of the seat slide apparatus 8.

A seat reclining apparatus 9 is disposed between the seat cushion 2 and the seatback 3. The seat reclining apparatus 9 is configured to restrict or allow a rotation (a tilt operation) of the seatback 3 relative to the seat cushion 2. That is, the seat reclining apparatus 9 selectively restricts and allows a relative rotation between the seatback 3 and the seat cushion 2. The occupant of the vehicle may adjust a tilt angle of the seatback 3 by means of the seat reclining apparatus 9.

Figure 2:
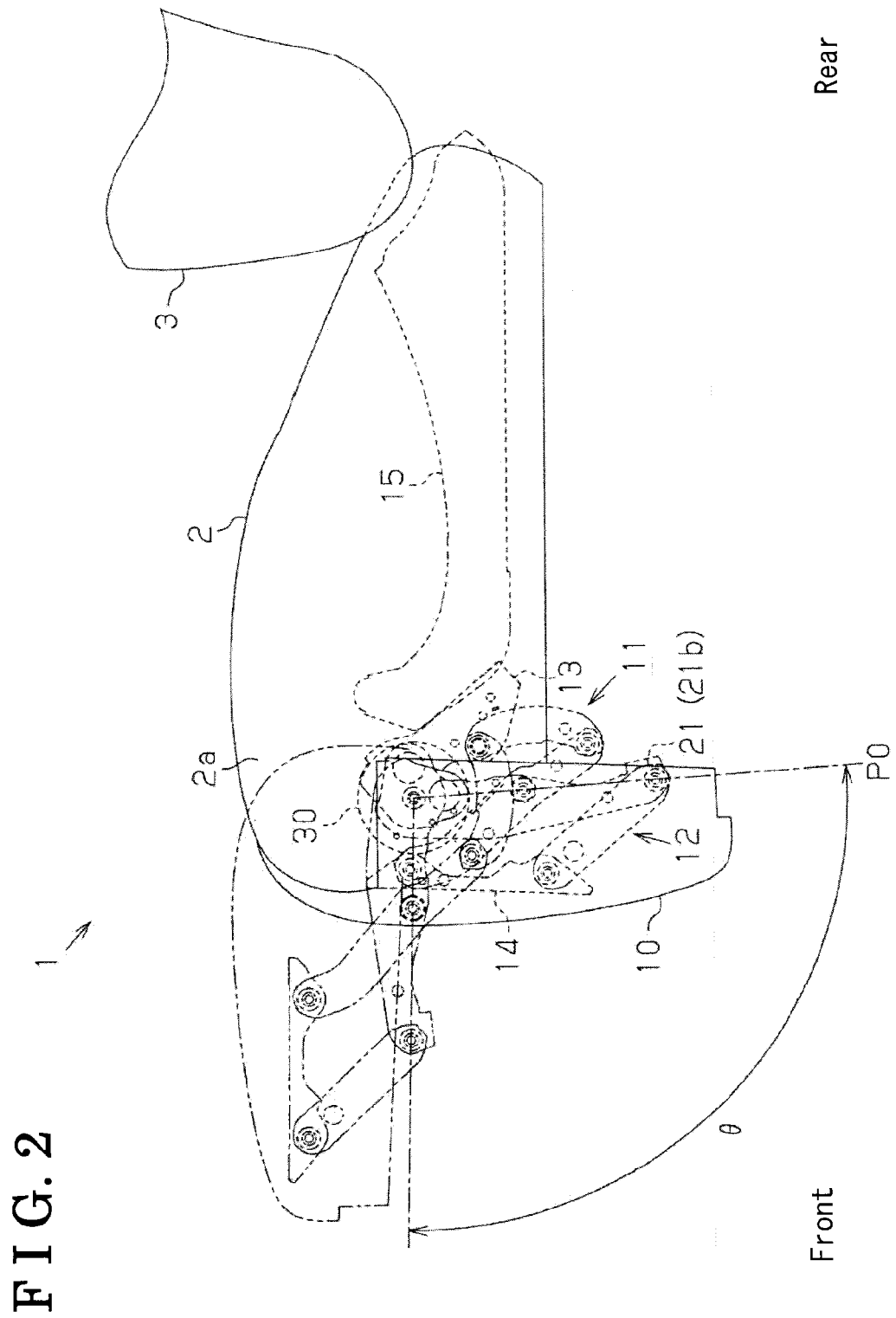
FIG. 2 is a side view of the seat including the ottoman device according to the first and second embodiments.

As illustrated in FIG. 2, the seat 1 includes an ottoman 10 provided at a front edge 2a of the seat cushion 2, and an ottoman device 11 selectively controlling the ottoman 10 to be deployed and positioned at a front portion of the seat 1 (i.e., at a front side of the seat cushion 2) and to be retracted to the front edge 2a of the seat cushion 2. The occupant of the vehicle may adjust a deployed position of the ottoman 10 by means of the ottoman device 11.

Figure 3:
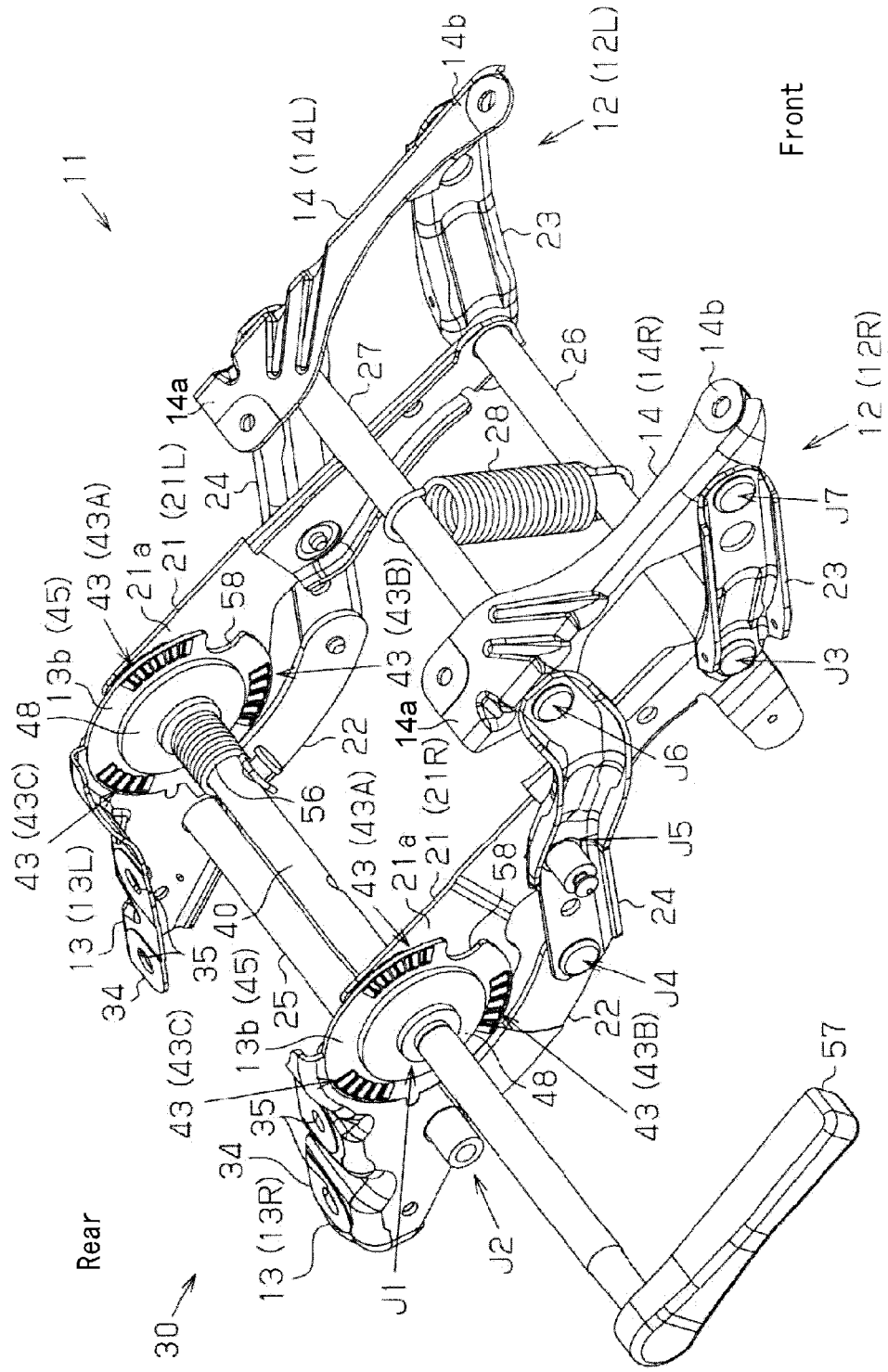
FIG. 3 is a perspective view of the ottoman device according to the first embodiment.
Figure 4:
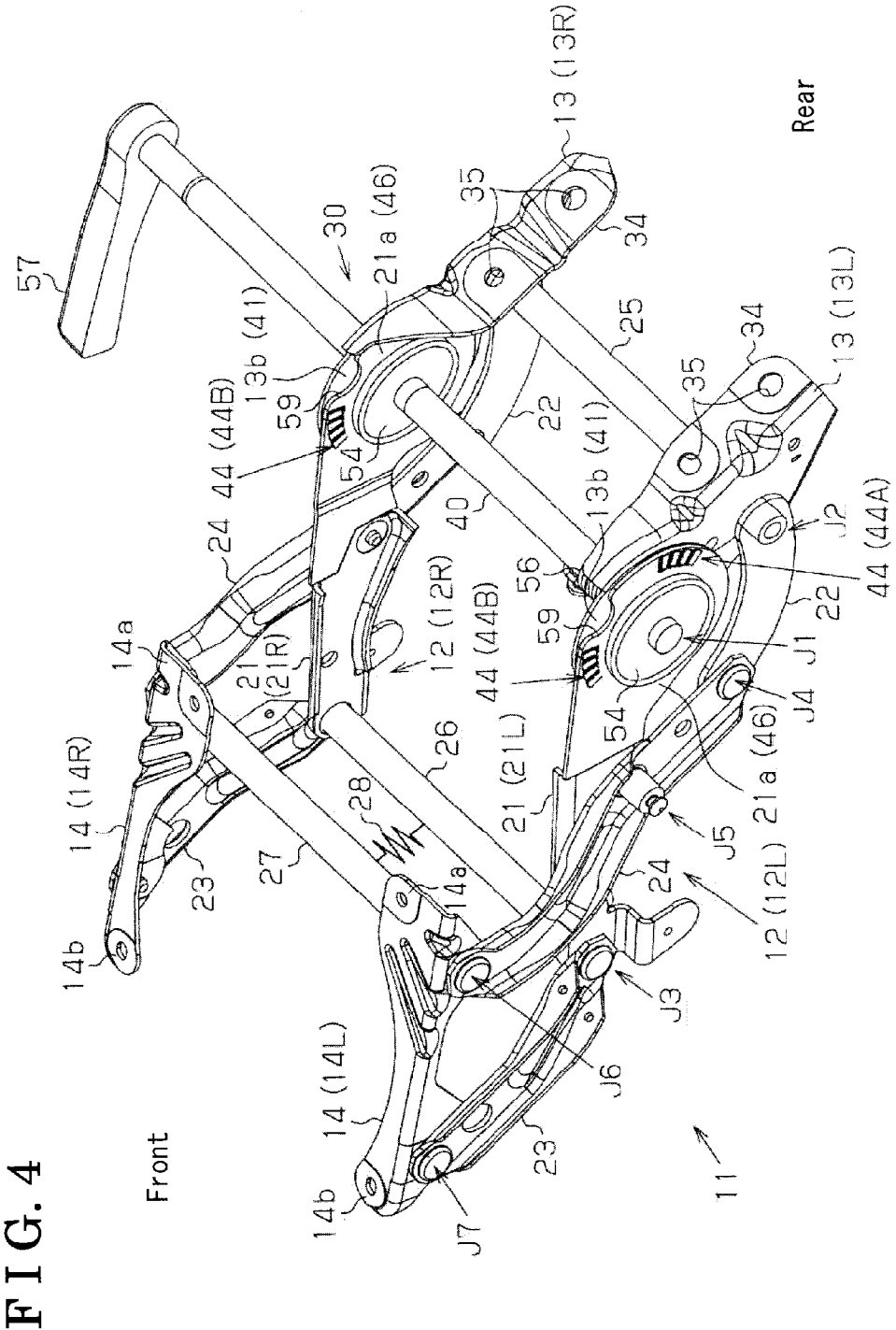
FIG. 4 is another perspective view of the ottoman device according to the first embodiment.

Specifically, as illustrated in FIGS. 3 and 4, the ottoman device 11 includes a pair of link mechanisms 12, i.e., left and right link mechanisms 12L and 12R. A first end (base end) of the pair of link mechanisms 12 is connected to a pair of base brackets 13, i.e., left and right base brackets 13L and 13R. A second end (tip end) of the pair of link mechanisms 12 is connected to a pair of support brackets 14, i.e., left and right support brackets 14L and 14R. As illustrated in FIG. 2, each of the base brackets 13 is fixed to a front end of a side frame 15 serving as a frame of the seat cushion 2 so as to be supported by the front edge 2a of the seat cushion 2, i.e., of the seat 1. That is, each of the base brackets 13 is arranged at the front edge 2a of the seat cushion 2, i.e., of the seat 1. As a result, according to the ottoman device 11 of the embodiment, the ottoman 10 fixed to the pair of support brackets 14 is supported at the front portion of the seat 1.

Figure 5:
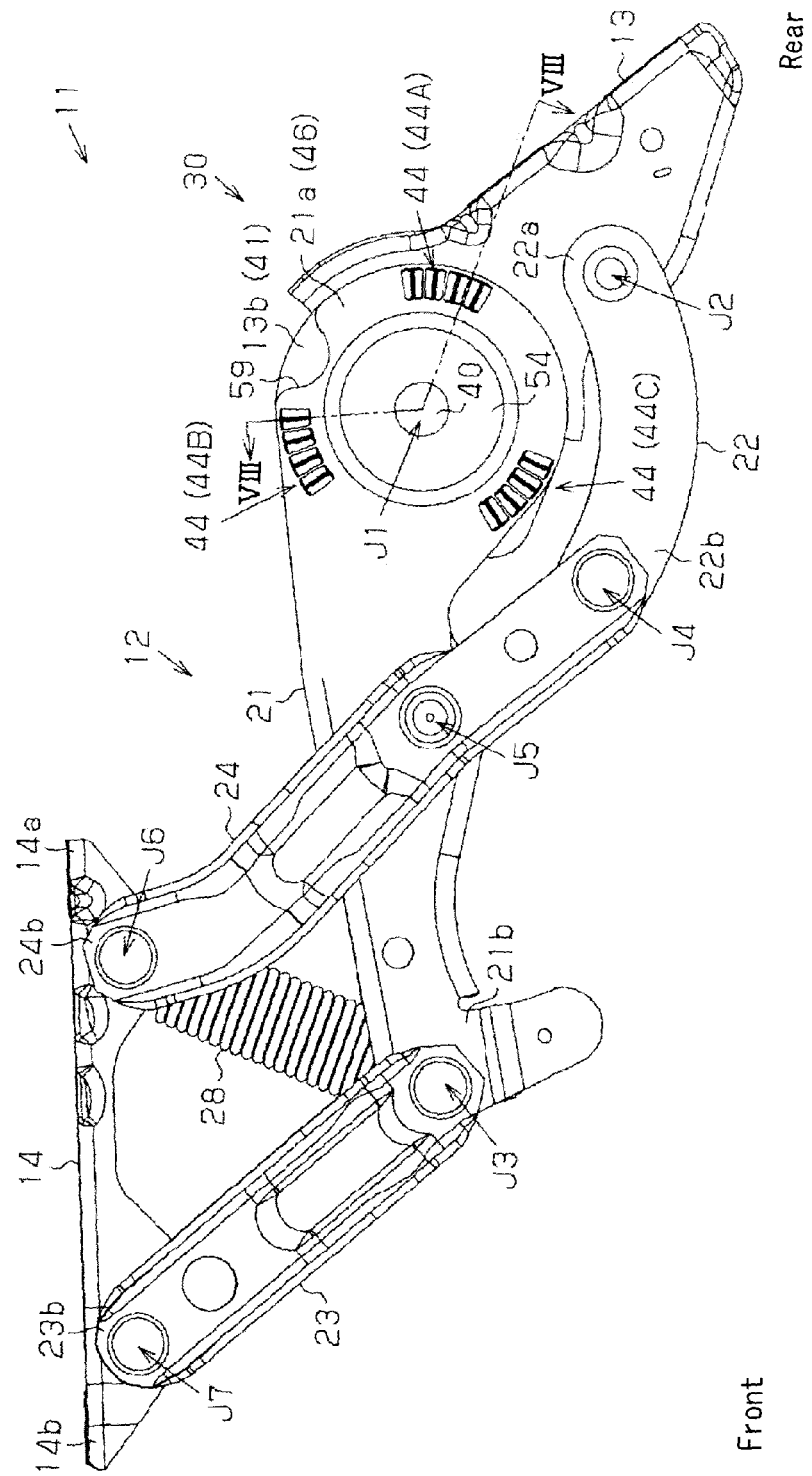
FIG. 5 is a side view of the ottoman device when an ottoman is in a fully deployed state according to the first embodiment.

FIG. 5 illustrates configurations of one of the pair of link mechanisms 12. The other of the pair of link mechanisms 12 includes the same configurations illustrated in FIG. 5. As illustrated in FIG. 5, each of the link mechanisms 12 includes a first rotation link 21 serving as a rotation link and a second rotation link 22 both of which are connected to the base bracket 13. The first rotation link 21 rotates about a first joint J1 provided at a first end (base end) 21a of the first rotation link 21. The second rotation link 22 rotates about a second joint J2 provided at a first end (base end) 22a of the second rotation link 22.

In addition, the link mechanism 12 includes a first pivot link 23 connected to the first rotation link 21 and a second pivot link 24 connected to the second rotation link 22. The first pivot link 23 rotates about a third joint J3 provided at a second end (tip end) 21b of the first rotation link 21. The second pivot link 24 rotates about a fourth joint J4 provided at a second end (tip end) 22b of the second rotation link 22.

The second pivot link 24 is connected to the first rotation link 21 in a state to rotate about a fifth joint J5 provided between the first joint J1 that is positioned at the first end 21a of the first rotation link 21 and the third joint J3 that is positioned at the second end 21b of the first rotation link 21. The second pivot link 24 is also connected to a rear end portion 14a of the support bracket 14 in a state to rotate about a sixth joint J6 provided at a second end (tip end) 24b of the second pivot link 24. The first pivot link 23 is connected to a front end portion 14b of the support bracket 14 in a state to rotate about a seventh joint J7 provided at a second end (tip end) 23b of the first pivot link 23.

As illustrated in FIGS. 3 to 5, the link mechanism 12 constitutes a so-called pantograph link in which the links 21 to 24 are rotatably connected to one another. In addition, a first connection bar 25 is arranged to extend between the left and right link mechanisms 12L and 12R. Specifically, the first connection bar 25 connects the left and right link mechanisms 12L and 12R at the respective second joints J2 thereof as illustrated in FIGS. 3 and 4 so that the left and right link mechanisms 12L and 12R integrally operate. According to the present embodiment, second and third connection bars 26 and 27 are also arranged to extend between the left and right link mechanisms 12L and 12R. The second connection bar 26 connects the left and right link mechanisms 12L and 12R at the respective third joints J3 thereof while the third connection bar 27 connects the left and right link mechanisms 12L and 12R at the respective sixth joints J6 thereof as illustrated in FIGS. 3 and 4. According to the ottoman device 11 of the embodiment, the ottoman 10 (the support brackets 14) is deployable at the front portion of the seat 1 and is retractable to the front edge 2a of the seat cushion 2 based on the operation of each of the link mechanisms 12.

Specifically, as illustrated in FIG. 2, the first rotation link 21 rotates in a state where the second end 21b is lifted up, i.e., rotates in a clockwise direction in FIG. 2, so that the ottoman 10 is deployed and positioned forward of the seat 1, i.e., at the front portion of the seat 1. That is, the ottoman 10 is brought to a deployed state. In a case where the first rotation link 21 rotates in a state where the second end 21b is pulled down, i.e., rotates in a counterclockwise direction in FIG. 2, the ottoman 10 is arranged in the vicinity of the front edge 2a of the seat cushion 2. That is, the ottoman 10 is brought to a retracted state.

Further specifically, as illustrated in FIGS. 3 and 5, a coil spring 28 is disposed between the second and third connection bars 26 and 27 to generate an elastic force (tensile force or elastic force) in a direction where the second and third connection bars 26 and 27 come close to each other. According to each of the link mechanisms 12 of the embodiment, a distance between the second and third connection bars 26 and 27 is configured to gradually decrease while the ottoman 10 is being deployed. The ottoman device 11 of the embodiment biases the link mechanism 12 in a deployed direction in which the ottoman 10 is deployed on a basis of the biasing force of the coil spring 28.

As illustrated in FIGS. 3 to 5, a lock mechanism 30 is formed at the first joints J1 at each of which the base bracket 13 and the first rotation link 21 (specifically, the first end 21a) are rotatably connected to each other to thereby restrict or allow the rotation of each of the first rotation links 21. The lock mechanism 30 is operated so that a locked state in which the rotation of each of the first rotation links 21 is prohibited and an unlocked state in which the rotation of each of the first rotation links 21 is allowed are switchable therebetween. As a result, the ottoman 10 is deployable to be positioned at the front portion of the seat 1. In addition, the deployed position of the ottoman 10 is adjustable.

Specifically, each of the link mechanisms 12 operates in the deployed direction by the lock mechanism 30 that allows the rotation of each of the first rotation links 21 based on the biasing force of the coil spring 28. In order to operate the link mechanisms 12 in a retracted direction in which the ottoman 10 is retracted, a load is input to the ottoman 10 against the biasing force of the coil spring 28. Then, the lock mechanism 30 is again brought to the locked state to arrange the ottoman 10 at a desired position.

Next, the lock mechanism 30 of the ottoman device 11 according to the present embodiment will be explained in detail. According to the embodiment, the base brackets 13 and the first rotation links 21 are formed of metal plate. The other links 22 to 24 and the support brackets 14 are also formed of metal plate.

Figure 6:
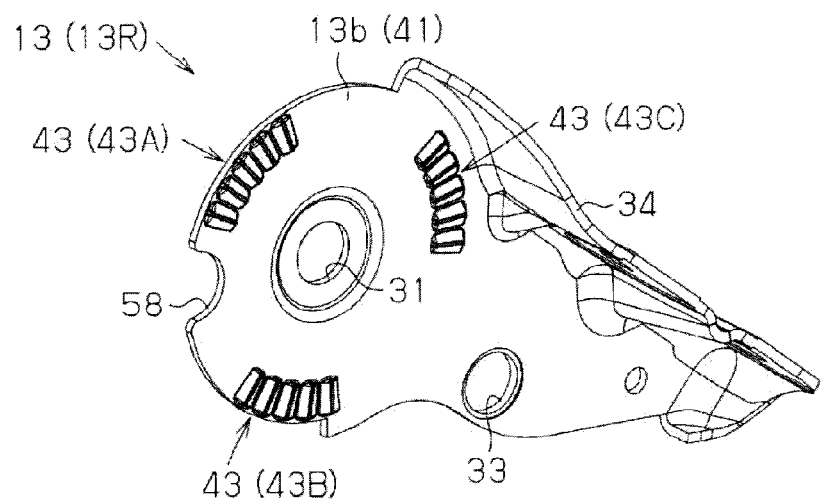
FIG. 6 is a perspective view of a base bracket according to the first embodiment.
Figure 7:
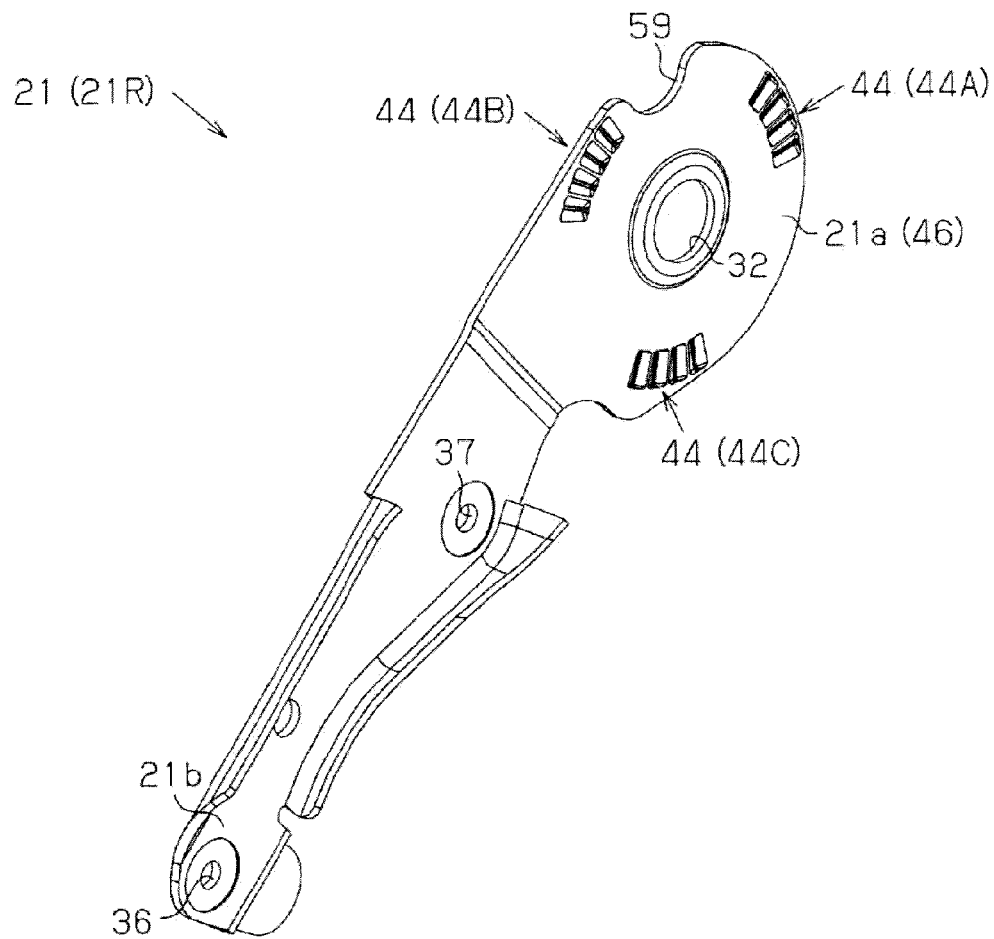
FIG. 7 is a perspective view of a first rotation link according to the first embodiment.

Specifically, as illustrated in FIGS. 6 and 7, the base bracket 13 and the first rotation link 21 include through-holes 31 and 32 respectively constituting the first joint J1 between the base bracket 13 and the first rotation link 21. The base bracket 13 also includes a through-hole 33 constituting the second joint J2 between the base bracket 13 and the second rotation link 22, and a fixation flange 34 used for a fixation of the base bracket 13 at the front edge 2a of the seat cushion 2 (i.e., at the front end of the side frame 15, see FIG. 2). Plural bolt insertion bores 35 are formed at the fixation flange 34 as illustrated in FIGS. 3 and 4. The first rotation link 21 also includes a through-hole 36 constituting the third joint J3 between the first rotation link 21 and the first pivot link 23, and a through-hole 37 constituting the fifth joint J5 between the first rotation link 21 and the second pivot link 24.

Figure 8:
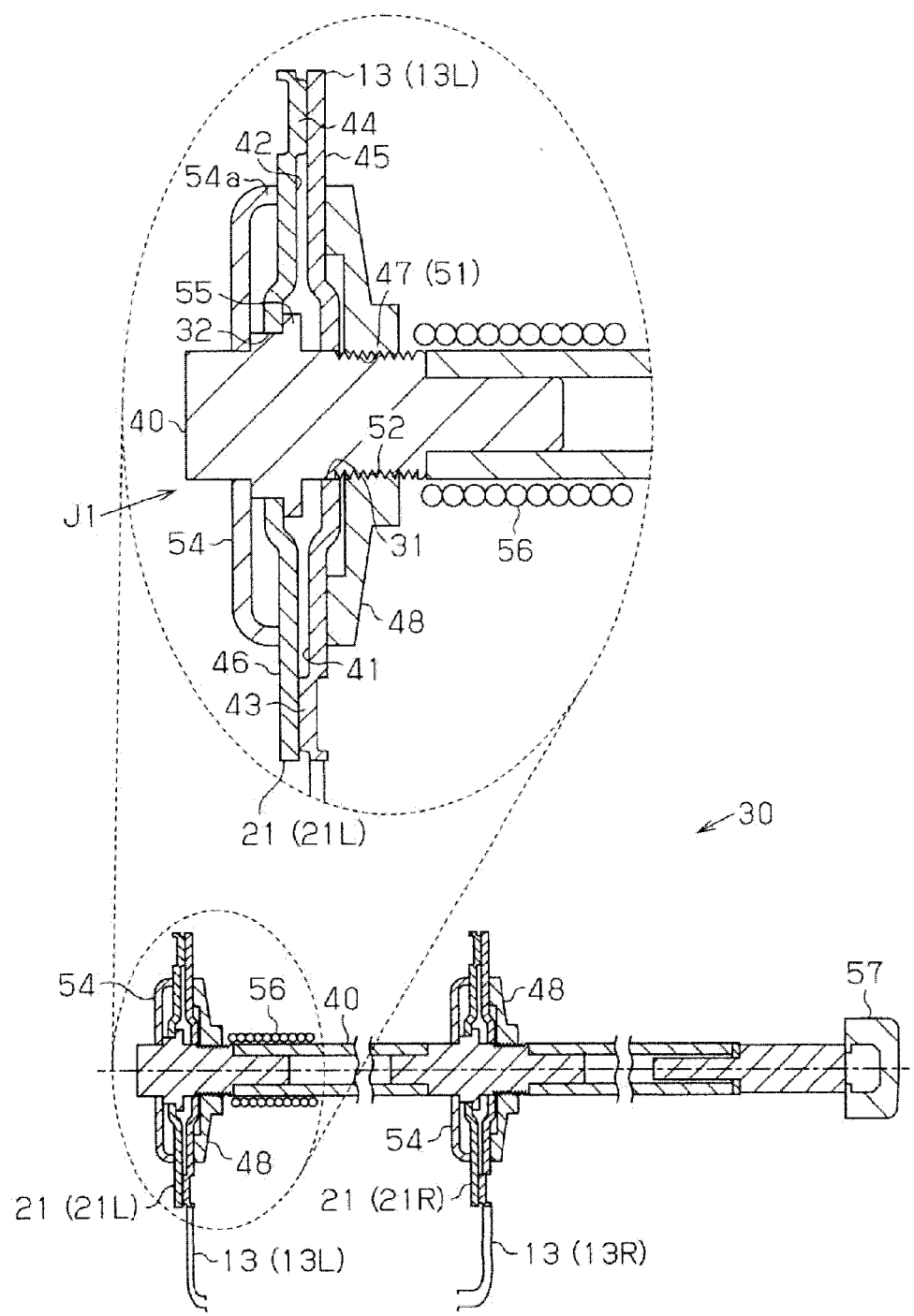
FIG. 8 is a cross-sectional view of a lock mechanism taken along line VIII-VIII in FIG. 5.

As illustrated in FIG. 8, the first joint J1 between the base bracket 13 and the first rotation link 21 is formed by a rotation shaft 40 inserted into the through-holes 31 and 32. Specifically, the rotation shaft 40 is inserted into the through-holes 31 and 32 of the left base bracket 13L and the left first rotation link 21L, and the through-holes 31 and 32 of the right base bracket 13R and the right first rotation link 21R so that the rotation shaft 40 penetrates through the left and right base brackets 13L and 13R and the left and right first rotation links 21L and 21R. The first rotation links 21 are rotatably connected to the respective base brackets 13 in a state to be supported by the rotation shaft 40.

As illustrated in FIGS. 6 to 8, concavo-convex portions 43 each including a wavy form are formed at a facing surface 41 of the base bracket 13 facing the first rotation link 21. The facing surface 41 is formed at a peripheral edge of the through-hole 31. The concavo-convex portions 43 are arranged around the rotation shaft 40 inserted into the through-hole 31 at the facing surface 41. In the same way, concavo-convex portions 44 each including a wavy form are formed at a peripheral edge of the through-hole 32 at a facing surface 42 of the first rotation link 21 facing the base bracket 13. The concavo-convex portions 44 are arranged around the rotation shaft 40 inserted into the through-hole 32 at the facing surface 42. According to the present embodiment, the concavo-convex portions 43 and 44 are formed by press working. FIG. 7 Illustrates a rear surface 46 of the first rotation link 21 serving as a rear side of the facing surface 42. In FIG. 7, the concavo-convex portions 44 appear as plural concave portions formed at the rear surface 46 by press working. The lock mechanism 30 of the present embodiment selectively restricts and prohibits the rotation of the first rotation link 21 by engagement between the concavo-convex portions 43 of the base bracket 13 and the concavo-convex portions 44 of the first rotation link 21. The concavo-convex portions 43 and 44 serve as engagement portions.

Figure 9A:
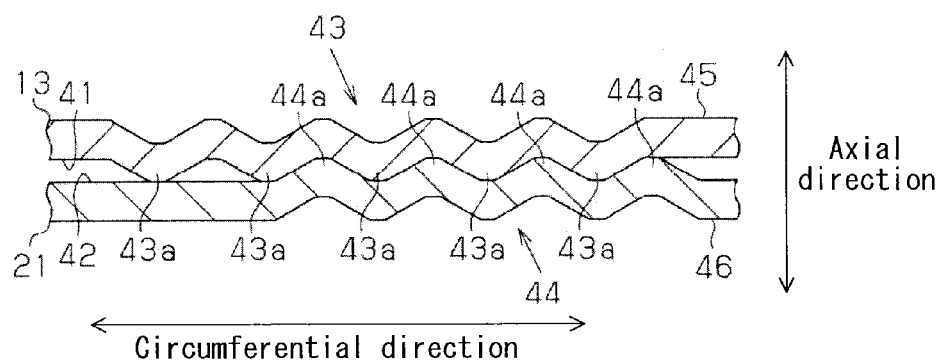
FIG. 9A is a cross-sectional view of concavo-convex portions at the base bracket and the first rotation link in an engagement state according to the first embodiment.
Figure 9B:
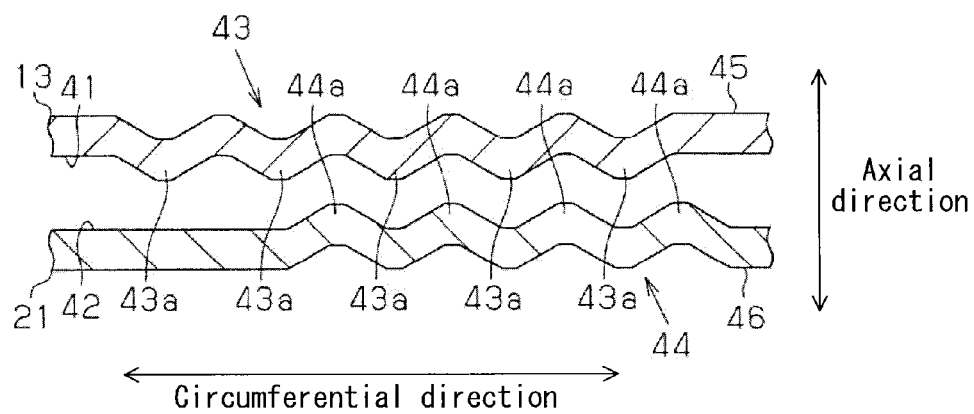
FIG. 9B is a cross-sectional view of the concavo-convex portions at the base bracket and the first rotation link in an engagement release state according to the first embodiment.

Specifically, as illustrated in FIGS. 9A and 9B, each of the concavo-convex portions 43 in a wavy form includes plural convex portions 43a arranged at intervals in a circumferential direction of the rotation shaft 40 and the through-hole 31, i.e., in a left and right direction in FIGS. 9A and 9B. In the same way, each of the concavo-convex portions 44 in a wavy form includes plural convex portions 44a arranged at intervals in the circumferential direction, i.e., in the left and right direction in FIGS. 9A and 9B. According to the embodiment, the concavo-convex portions 43 and 44 are formed so that configurations thereof are substantially the same as one another.

The concavo-convex portion 43 of the base bracket 13 and the concavo-convex portion 44 of the first rotation link 21 engage with each other in a state where the convex portions 43a and the convex portions 44a are meshed with one another. As a result, the relative rotation between the base bracket 13 and the first rotation link 21 may be restricted.

As illustrated in FIG. 6, the concavo-convex portions 43 are arranged at plural portions at intervals in the circumferential direction around the rotation shaft 40, i.e., around the through-hole 31. In the same way, as illustrated in FIG. 7, the concavo-convex portions 44 are arranged at plural portions at intervals in the circumferential direction around the rotation shaft 40, i.e., around the through-hole 32. Specifically, according to the present embodiment, the concavo-convex portions 43 are provided at three portions of the base bracket 13 at substantially even intervals in the circumferential direction, i.e., concavo-convex portions 43A, 43B, and 43C are provided. In the same way, the concavo-convex portions 44 are provided at three portions of the first rotation link 21 at substantially even intervals in the circumferential direction, i.e., concavo-convex portions 44A, 44B, and 44C are provided. Each of the concavo-convex portions 43 (the concavo-convex portions 43A, 43B, and 43C) of the base bracket 13 includes five convex portions 43a while each of the concavo-convex portions 44 (concavo-convex portions 44A, 44B, and 44C) of the first rotation link 21 includes four convex portions 44a as illustrated in FIGS. 9A and 9B.

According to the embodiment, the first rotation link 21 is rotable in an axial direction of the rotation shaft 40 relative to the base bracket 13 to which the first rotation link 21 is connected. The relative position between the base bracket 13 and the first rotation link 21 in the axial direction is changed so that the locked state where the rotation of the first rotation link 21 is prohibited and the unlocked state where the rotation of the first rotation link 21 is allowed are switchable therebetween.

Specifically, as illustrated in FIG. 8, a connection member 48 is fixed to a rear surface 45 of each of the base brackets 13. The connection member 48 includes a through-hole 47 at a position coaxial with the through-hole 31. An internal thread 51 is formed at an inner periphery of the through-hole 47. Further, an external thread 52 is formed at a portion of an outer periphery of the rotation shaft 40 facing the connection member 48 so as to be meshed with the internal thread 51. That is, the rotation shaft 40 is supported relative to each of the base brackets 13 via a thread engagement portion constituted by the internal thread 51 and the external thread 52. The rotation shaft 40 is movable relative to each of the base brackets 13 in the axial direction based on a thread engagement relation (screw pair), i.e., based on the engagement relation between the internal thread 51 and the external thread 52.

According to the present embodiment, configurations of the internal thread 51 and the external thread 52 are determined so that the thread engagement portion constituted by the internal thread 51 and the external thread 52 is inhibited from converting an axial movement of the rotation shaft 40 into the rotation of the rotation shaft 40, i.e., inhibited from transmitting a reverse input.

A guide plate 54 is fixed to the rotation shaft 40 to slidably contact the rear surface 46 of each of the first rotation links 21. The guide plate 54 of the present embodiment is formed of metal plate into a substantially flat cup. An edge of an annular peripheral wall portion 54a is slidably in contact with the rear surface 46 of the first rotation link 21.

A circular flange portion 55 is formed at the rotation shaft 40 so as to slidably contact the facing surface 42 of each of the first rotation links 21. The movement of each of the first rotation links 21 relative to the rotation shaft 40 in the axial direction thereof is restricted by the guide plate 54 and the flange portion 55.

Each of the first rotation links 21 of the embodiment integrally moves with the rotation shaft 40 in the axial direction thereof when the rotation shaft 40 rotates. As a result, the relative position of the first rotation link 21 relative to the base bracket 13 in the axial direction is changed.

A torsion coil spring 56 is arranged at the outer periphery of the rotation shaft 40 in a state to loosely fit to the outer periphery. The rotation shaft 40 is biased to rotate in a direction in which each of the first rotation links 21 comes close to or approaches the base bracket 13 based on an elastic force of the torsion coil spring 56. Then, an operation lever 57 serving as an operation member is fixed to one end of the rotation shaft 40, i.e., a right end side in FIG. 8, for operating and rotating the rotation shaft 40 so as to achieve the function of the lock mechanism 30 according to the present embodiment.

As illustrated in FIG. 9A, in a case where the operation lever 57 is not operated, each of the first rotation links 21 moves in a direction to come close to the base bracket 13 facing the first rotation link 21 in the axial direction by the rotation of the rotation shaft 40 based on the elastic force of the torsion coil spring 56. As a result, the concavo-convex portions 43 at the base bracket 13 and the concavo-convex portions 44 at the first rotation link 21 engage with one another to restrict the rotation of the first rotation link 21 relative to the base bracket 13.

Figure 10:
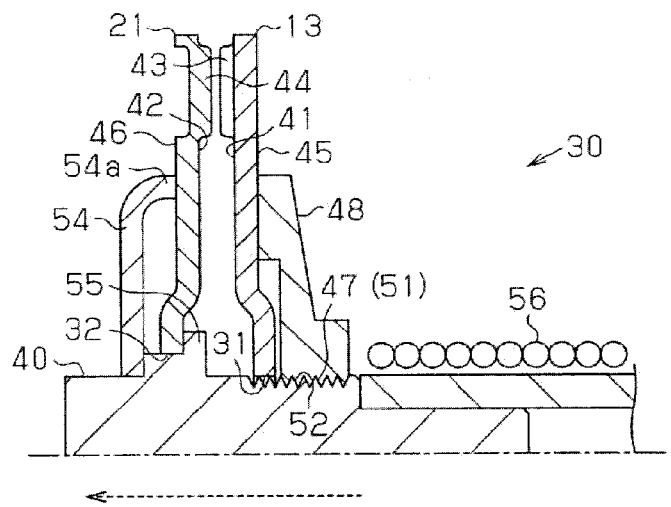
FIG. 10 is a cross-sectional view of the concavo-convex portions at the base bracket and the first rotation link in the engagement release state obtained by an axial movement of a rotation shaft and a guide plate relative to the base bracket according to the first embodiment.

On the other hand, as illustrated in FIGS. 9B and 10, in a case where the operation lever 57 is operated against the elastic force of the torsion coil spring 56, each of the first rotation links 21 integrally moves with the rotation shaft 40 in a direction away from the base bracket 13. As a result, the concavo-convex portions 43 at the base bracket 13 and the concavo-convex portions 44 at the first rotation link 21 are inhibited from making contact with one another and therefore the engagement between the concavo-convex portions 43 and 44 is released. That is, the concavo-convex portions 43 and 44 are in an engagement release state. The rotation of the first rotation link 21 relative to the base bracket 13 is permitted accordingly.

In a case where a user releases his/her hand from the operation lever 57, the rotation shaft 40 rotates in a direction where each of the first rotation links 21 comes close to the base bracket 13 based on the elastic force of the torsion coil spring 56. That is, the concavo-convex portions 43 and 44 of the base bracket 13 and the first rotation link 21 are again engageable with one another. The lock mechanism 30 of the present embodiment is configured to selectively switch between the locked state and the unlocked state by the operation of the operation lever 57 in the aforementioned manner.

Figure 11:
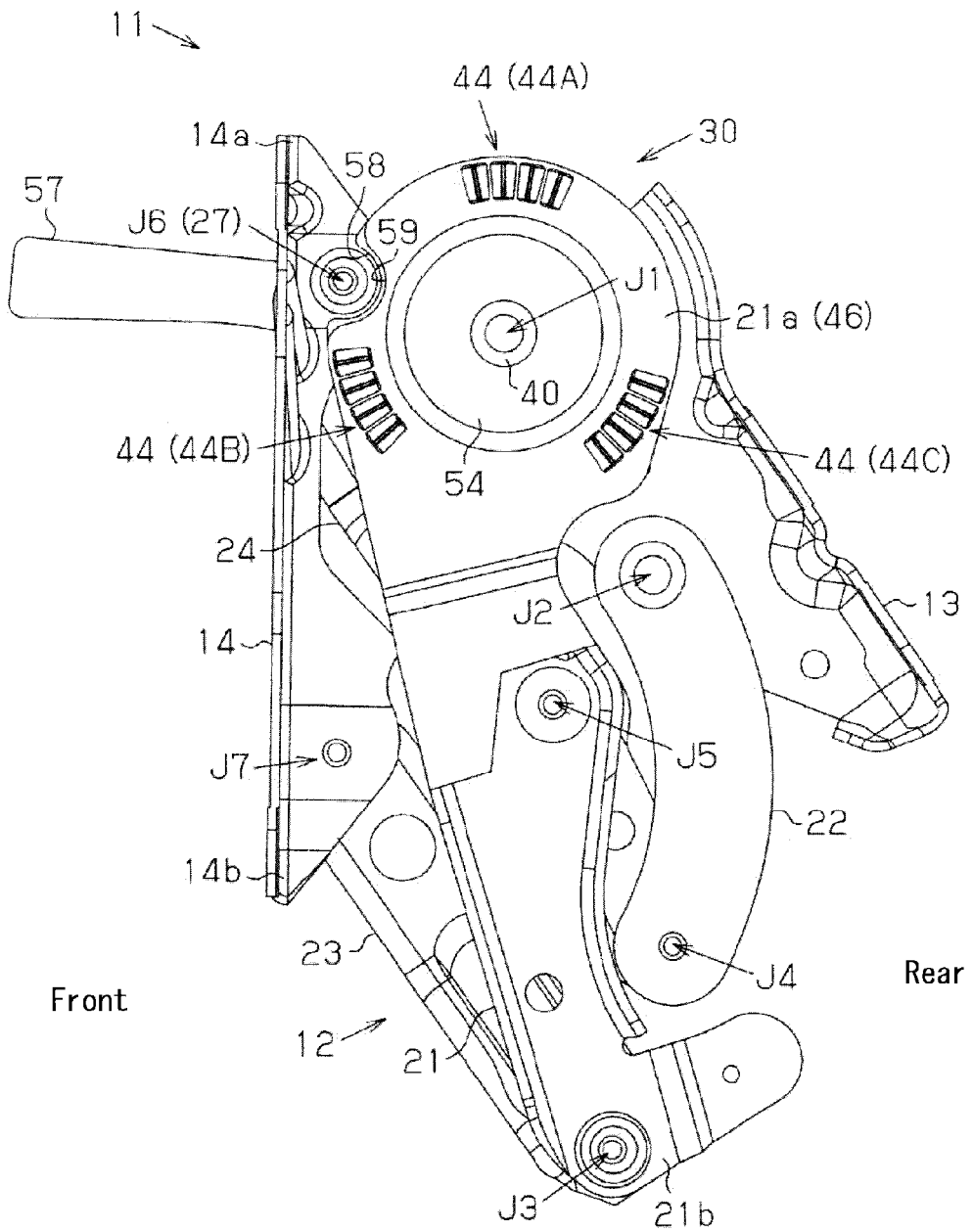
FIG. 11 is a side view of the ottoman device when the ottoman is in a retracted state according to the first embodiment.
Figure 12:
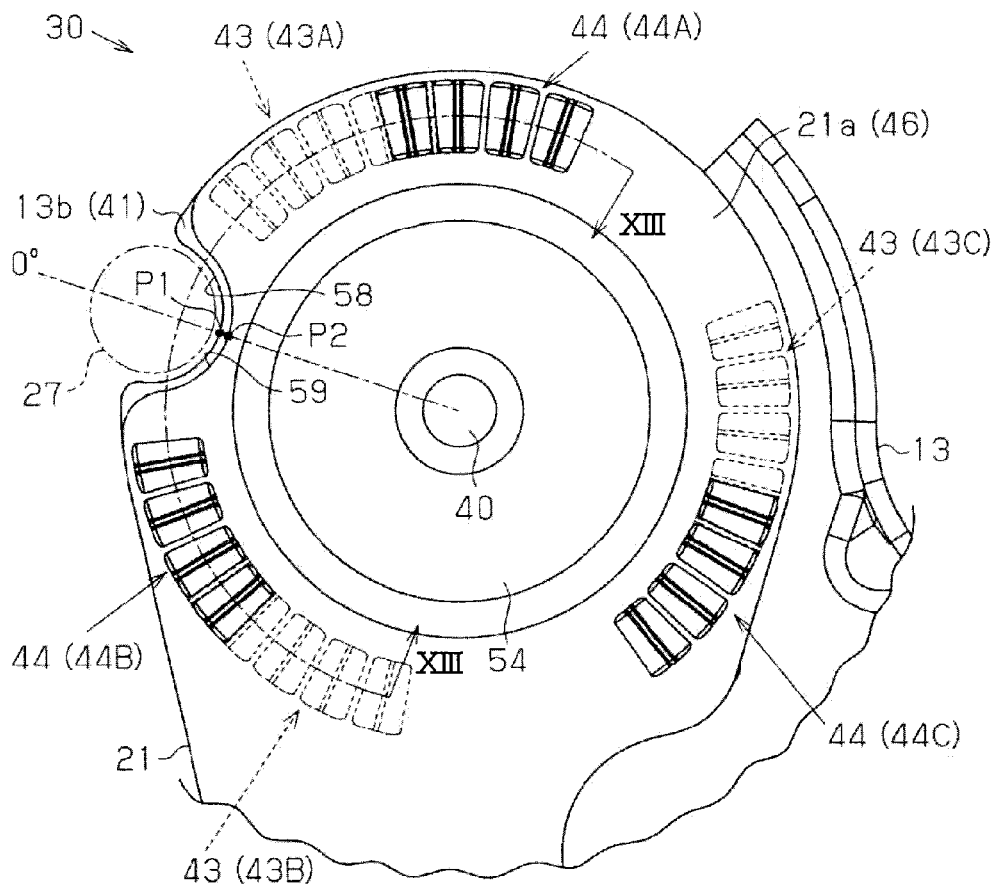
FIG. 12 is a side view of the rotation shaft and a portion around the rotation shaft when the ottoman is in the retracted state according to the first embodiment.

As illustrated in FIGS. 2 and 11, in a case where the ottoman 10 (the support brackets 14) is retracted to the front edge 2a of the seat cushion 2, the concavo-convex portions 44A, 44B, and 44C at the first rotation link 21 engage with the concavo-convex portions 43A, 43B, and 43C at the base bracket 13 respectively as illustrated in FIG. 12.

As illustrated in FIGS. 11 and 12, substantially circular-formed cut portions 58 and 59 are formed at an end 13b of the base bracket 13 and the first end 21a of the first rotation link 21, respectively. When the ottoman 10 is in the retracted state, the third connection bar 27 constituting the sixth joint J6 of each of the link mechanisms 12 is arranged at an inside of the cut portions 58 and 59.

Figure 13:
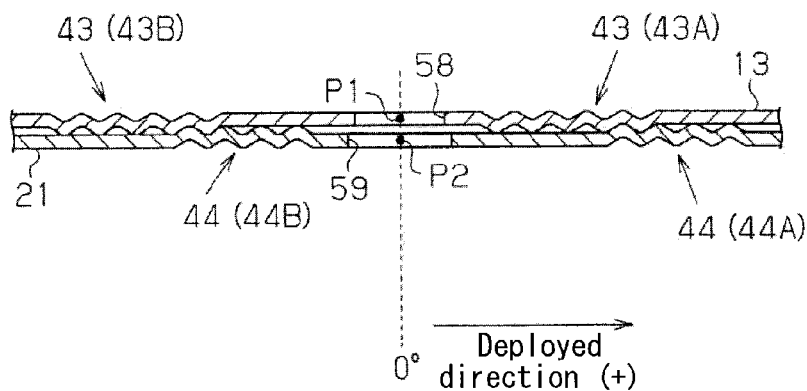
FIG. 13 is a cross-sectional view of the base bracket and the first rotation link in a circumferential direction of the rotation shaft taken along line XIII-XIII in FIG. 12.

As illustrated in FIGS. 12 and 13, a rotation angle θ of the first rotation link 21 is specified to be zero (0°) in a case where the third connection bar 27 is arranged at the cut portions 58 and 59, i.e., in a case where circumferential positions (P1 and P2) of the cut portions 58 and 59 around the rotation shaft 40 match each other. According to the lock mechanism 30 of the present embodiment, in a predetermined rotation range of the first rotation link 21 in which the rotation angle θ is smaller than zero (i.e., the rotation angle θ is a negative value), the concavo-convex portions 44A, 44B and 44C of the first rotation link 21 are engageable with the concavo-convex portions 43A, 43B, and 43C of the base bracket 13 to thereby maintain the ottoman 10 in the retracted state.

Figure 14:
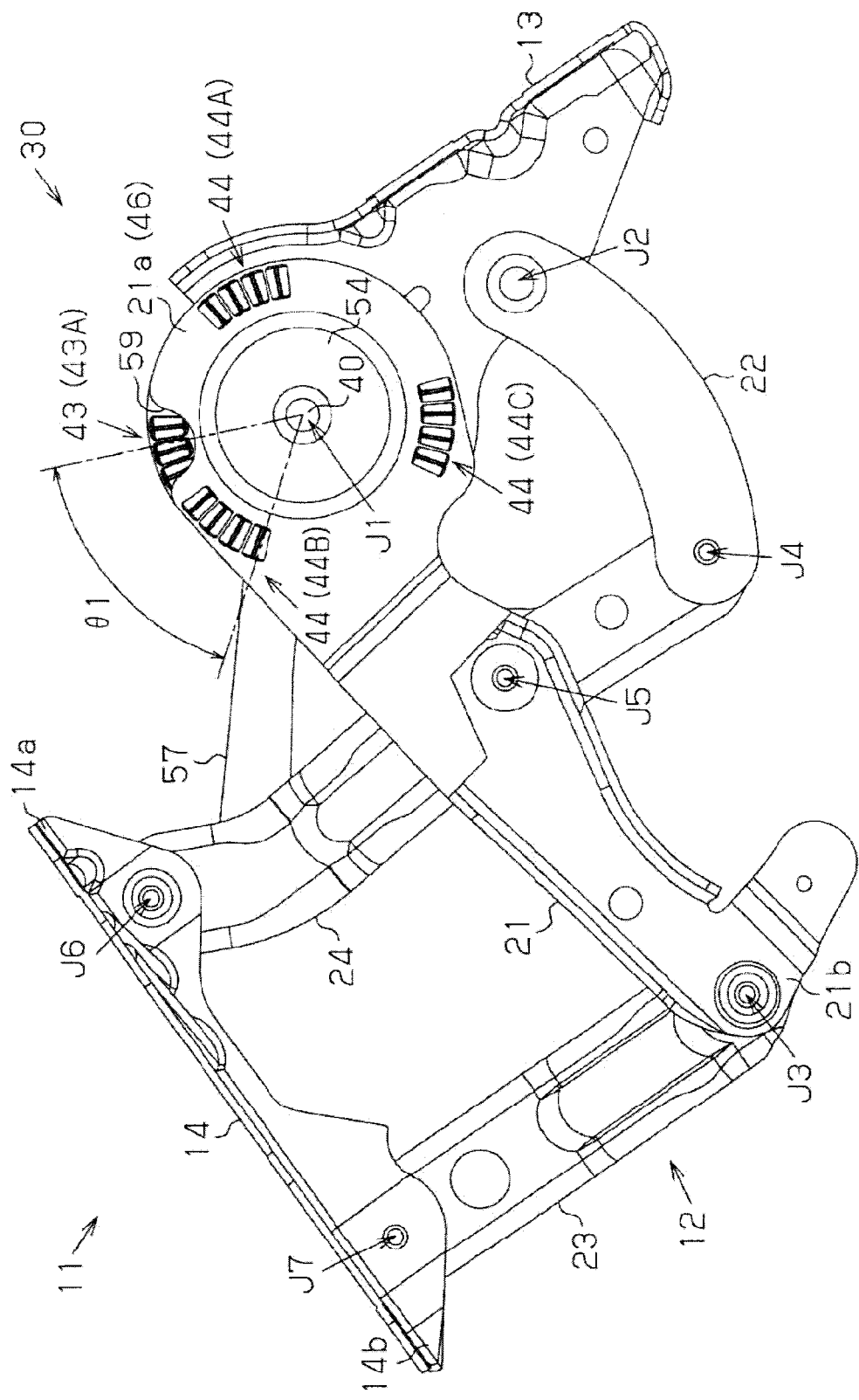
FIG. 14 is a side view of the ottoman device when the ottoman is in a minimum deployed state according to the first embodiment.
Figure 15:
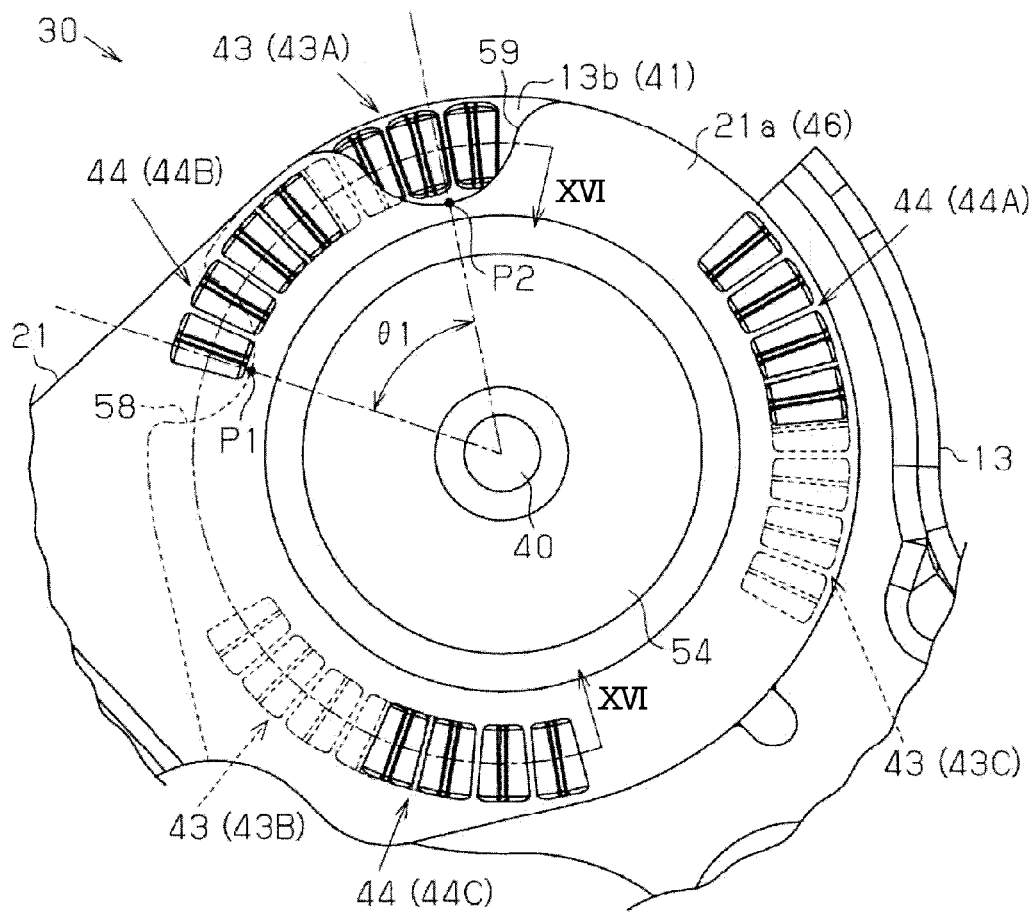
FIG. 15 is a side view of the rotation shaft and a portion around the rotation shaft when the ottoman is in the minimum deployed state according to the first embodiment.
Figure 16:
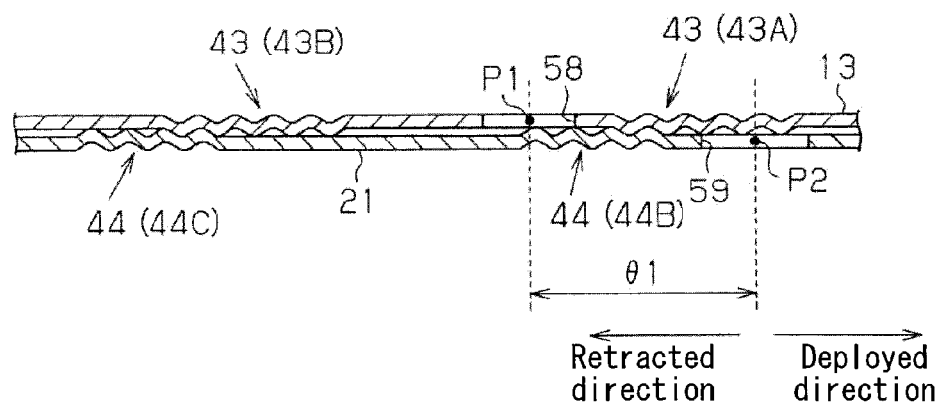
FIG. 16 is a cross-sectional view of the base bracket and the first rotation link in the circumferential direction of the rotation shaft taken along line XVI-XVI in FIG. 15.
Figure 17:
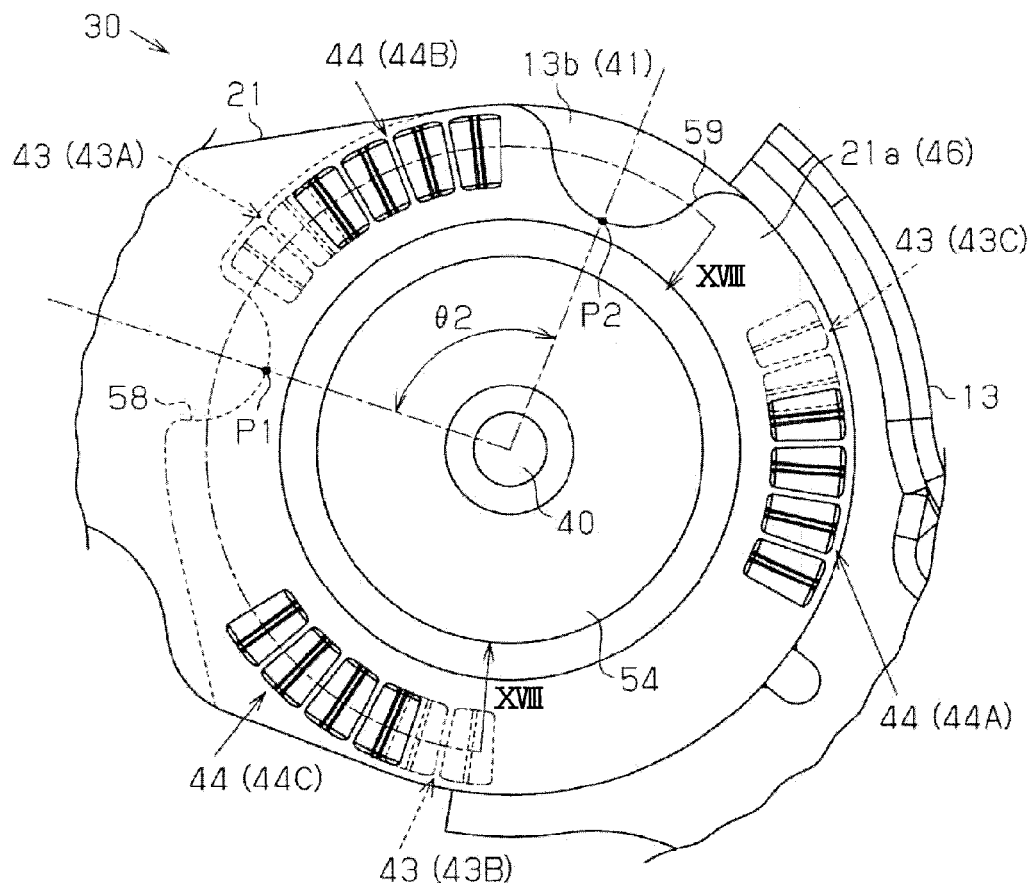
FIG. 17 is a side view of the rotation shaft and a portion around the rotation shaft when the ottoman is in the fully deployed state according to the first embodiment.
Figure 18:
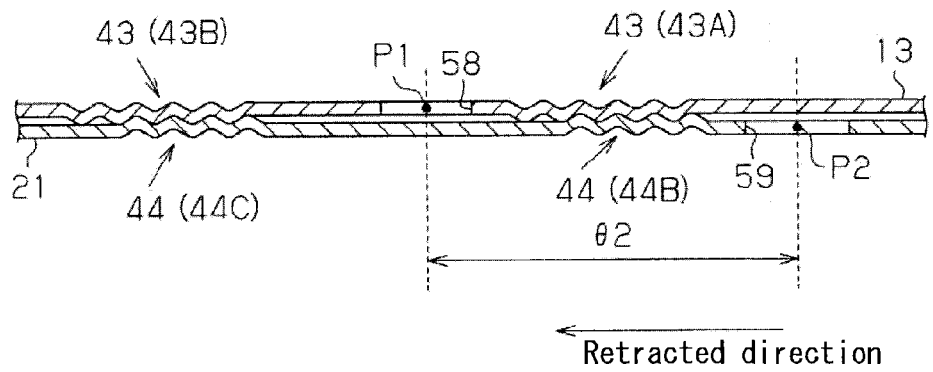
FIG. 18 is a cross-sectional view of the base bracket and the first rotation link in the circumferential direction of the rotation shaft taken along line XVIII-XVIII in FIG. 17.

As illustrated in FIGS. 14 to 16, in a case where each of the first rotation links 21 rotates in the deployed direction by equal to or greater than an angle θ1, the concavo-convex portions 44A, 44B, and 44C of the first rotation link 21 are engageable with the concavo-convex portions 43A, 43B, and 43C of the base bracket 13, i.e., the ottoman 10 is in a minimum deployed state. In addition, in a case where the rotation angle θ is equal to an angle θ2 as illustrated in FIGS. 17 and 18, the ottoman 10 is in a fully deployed state (see FIG. 5). In the fully deployed state of the ottoman 10, all the convex portions 44a constituting the concavo-convex portions 44A, 44B, and 44C of the first rotation link 21 are configured to engage with the corresponding convex portions 43a constituting the concavo-convex portions 43A, 43B, and 43C of the base bracket 13 as illustrated in FIG. 9A.

According to the ottoman device 11 of the embodiment, the deployed position of the ottoman 10 (the link mechanisms 12) is adjustable within a rotation range in which the rotation angle θ of the first rotation link 21 is between the angles θ1 and θ2. A rotation range where the rotation angle θ is between zero and θ1 is an idle area so that the deployed position of the ottoman 10 is inhibited from being maintained or held.

Figure 19:
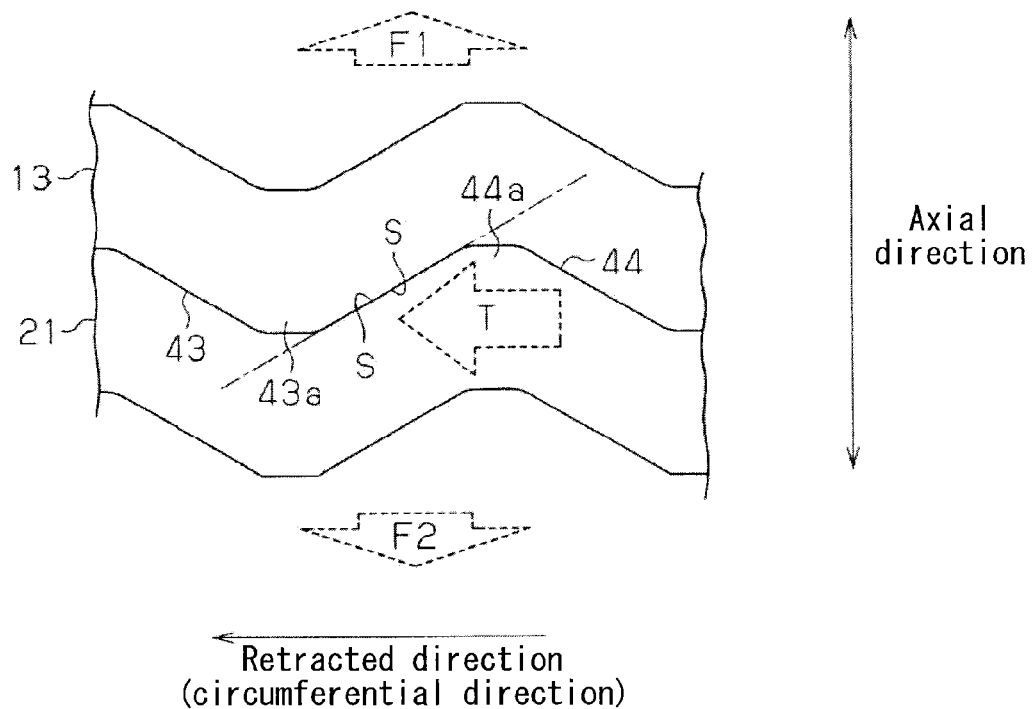
FIG. 19 is a schematic view illustrating the engagement state of the concavo-convex portions at the base bracket and the first rotation link with inclined surfaces serving as engagement surfaces according to the first embodiment.

As illustrated in FIG. 19, each of the concavo-convex portions 43 of the base bracket 13 and each of the concavo-convex portions 44 of the first rotation link 21 engage with each other in a state where inclined surfaces S formed at side surfaces of the convex portions 43a and 44a respectively in the circumferential direction serve as engagement surfaces. Thus, in a case where a rotation torque T is input for rotating the first rotation link 21 based on a load input to the ottoman 10, forces F1 and F2 are generated at the base bracket 13 and the first rotation link 21 respectively in directions so that the base bracket 13 and the first rotation link 21 are separated from each other.

According to the present embodiment, the guide plate 54 (see FIG. 8) slidably contacting the rear surface 46 of the first rotation link 21 serves as a restriction portion. Thus, the first rotation link 21 is restricted from moving relative to the base bracket 13 in the axial direction in which the first rotation link 21 is separated from the base bracket 13. Accordingly, the engagement between the concavo-convex portions 43 of the base bracket 13 and the concavo-convex portions 44 of the first rotation link 21 is maintained to restrict the rotation of the first rotation link 21.

Figure 20:
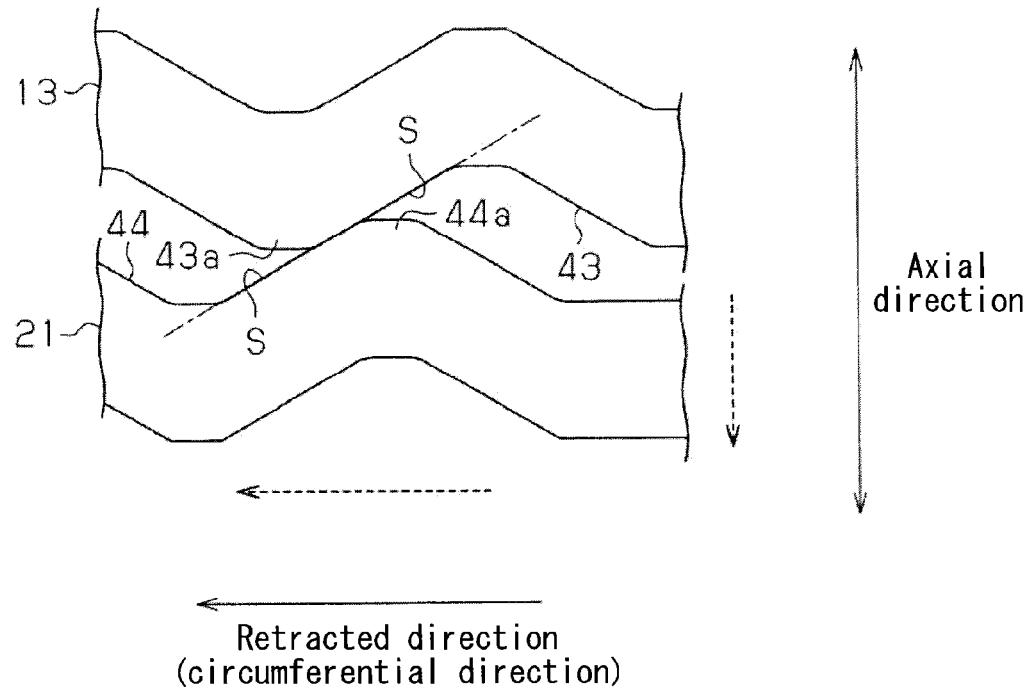
FIG. 20 is a schematic view illustrating the engagement release state of the concavo-convex portions at the base bracket and the first rotation link with the inclined surfaces serving as the engagement surfaces according to the first embodiment.

Further, according to the present embodiment, in a case where the forces F1 and F2 acting in the directions in which the base bracket 13 and the first rotation link 21 are separated from each other are excessive, i.e., the input load to the ottoman 10 is excessive, the guide plate 54 serving as the restriction portion is deflected or bent in a direction separating from the base bracket 13 (i.e., to the left side in FIG. 8). As illustrated in FIG. 20, the first rotation link 21 moves relative to the base bracket 13 in a direction separating from the base bracket 13 in a state where the engagement surfaces, i.e., the inclined surfaces S, of the concavo-convex portion 43 and the concavo-convex portion 44 are displaced from each other in the axial direction. As a result, the engagement between each of the concavo-convex portions 43 of the base bracket 13 and each of the concavo-convex portions 44 of the first rotation link 21 is released.

According to the ottoman device 11 of the present embodiment, the ottoman 10 may be maintained or held in the deployed state in a load range in which the guide plate 54 serving as the restriction portion restricts the relative movement between the base bracket 13 and the first rotation link 21 in the axial direction (i.e., a relative axial movement between the base bracket 13 and the first rotation link 21) so that the engagement state between the concavo-convex portions 43 and 44 is maintained.

That is, in a case where the excessive load is input to the ottoman 10 so that the guide plate 54 is inhibited from restricting the relative movement between the base bracket 13 and the first rotation link 21 in the axial direction, the engagement between the concavo-convex portions 43 and 44 is released by the aforementioned relative movement in the axial direction, thereby allowing the rotation of the first rotation link 21. Then, according to the present embodiment, the ottoman 10 moves in the retracted direction to release the excess load input to the ottoman 10.

According to the aforementioned embodiment, the first rotation link 21 constituting each of the link mechanisms 12 (the left and right link mechanisms 12L and 12R) is connected to the base bracket 13 via the rotation shaft 40. The concavo-convex portions 43 are formed at the facing surface 41 of the base bracket 13 formed at the peripheral edge of the rotation shaft 40 while the concavo-convex portions 44 are formed at the facing surface 42 of the first rotation link 21 formed at the peripheral edge of the rotation shaft 40. The concavo-convex portions 43 and the concavo-convex portions 44 both including the inclined surfaces S that serve as the engagement surfaces engage with one another to restrict the rotation of the first rotation link 21. Further, the first rotation link 21 is inhibited from moving in the axial direction relative to the base bracket 13 so that the first rotation link 21 is inhibited from separating from the base bracket 13 by the guide plate 54 that slidably contacts the rear surface 46 of the first rotation link 21. In a case where the excessive load is input to the ottoman 10, the guide plate 54 is deflected or bent so that the first rotation link 21 moves relative to the base bracket 13 in the direction separating from the base bracket 13. As a result, the engagement between the concavo-convex portions 43 and 44 is released.

That is, because of the engagement between the concavo-convex portions 43 and 44 in a state where the inclined surfaces S serve as the engagement surfaces, the forces F1 and F2 are applied to the base bracket 13 and the first rotation link 21 respectively in the directions where the base bracket 13 and the first rotation link 21 are separated from each other on a basis of the load input to the ottoman 10. Then, the guide plate 54 restricts the relative movement between the base bracket 13 and the first rotation link 21 in the axial direction against the forces F1 and F2. Accordingly, the engagement between the concavo-convex portions 43 and 44 is maintained.

According to the aforementioned configurations, the ottoman 10 supported by respective end portions of the link mechanisms 12 may be held in the deployed state in the load range where the engagement between the concavo-convex portions 43 and 44 is maintainable by the guide plate 54 that restricts the relative movement between the first rotation link 21 and the base bracket 13 in the axial direction. In a case where the excessive load is input to the ottoman 10 by an occupant seated on the ottoman 10 or the occupant placing one knee on the ottoman 10, for example, the engagement between the concavo-convex portions 43 and 44 is released so that the ottoman 10 moves in the retracted direction to release the excessive input load. Further, a fact that the occupant uses the ottoman 10 in an inappropriate way may be notified to the occupant via the operation of the ottoman 10 moving in the retracted direction and the occupant may be urged to stop such inappropriate usage. As a result, a load applied to components of the ottoman device 11, for example, to the links 21 to 24 and the joints J1 to J7 connecting the links 21 to 24, may be reduced. Rigidity necessary for the aforementioned components of the ottoman device 11 decreases to thereby obtain reduced cost and weight.

In addition, the concavo-convex portions 43 and 44 serve as the engagement portions so that the engagement position between the concavo-convex portions 43 and 44 is finely adjustable. As a result, the deployed position of the ottoman 10 may be more finely adjustable. In addition, the concavo-convex portions 43 and 44 may be simply configured and easily formed by press working, for example.

Further, the concavo-convex portions 43 of the base bracket 13 and the concavo-convex portions 44 of the first rotation link 21 are formed at the plural portions around the rotation shaft 40 at intervals in the circumferential direction. Therefore, the engagement force between the concavo-convex portions 43 and 44 may be generated around the rotation shaft 40 in a balanced manner. As a result, even in a case where the load is input to the ottoman 10 unevenly or ununiformly, the deployed position of the ottoman 10 may be stably maintained.

Furthermore, the connection member 38 including the through-hole 47 of which the inner periphery is formed by the internal thread 51 is fixed to the rear surface 45 of the base bracket 13. In addition, the external thread 52 is formed at the outer periphery of the rotation shaft 40 so as to be meshed with the internal thread 51. The guide plate 54 serving as the restriction portion is fixed to the rotation shaft 40 so as not to be movable relative to the rotation shaft 40 in the axial direction. The operation lever 57 is fixed to one end of the rotation shaft 40 to rotate the rotation shaft 40.

Accordingly, in a case where the rotation shaft 40 rotates by the operation of the operation lever 57, the rotation shaft 40 integrally moves with the guide plate 54 in the axial direction based on the thread engagement relation (screw pair) between the internal thread 51 and the external thread 52. Thus, an operation portion that changes the relative position between the base bracket 13 and the first rotation link 21 may be achieved by a simple structure. According to the present embodiment, the rotation shaft 40 serves as the operation portion. Then, the first rotation link 21 is separated from the base bracket 13 so that the concavo-convex portions 43 and 44 are inhibited from contacting one another, which results in the disengagement of the concavo-convex portions 43 and 44. The rotation shaft 40 is arranged to extend in the width direction of the seat 1, i.e., of the seat cushion 2, in view of the configurations of the ottoman device 11. Accordingly, the operation lever 57 provided at one end of the rotation shaft 40 may obtain an improved operability. In addition, the rotation shaft 40 moves in the axial direction by means of the thread engagement relation to thereby reduce the operating force of the operation lever 57.

According to the aforementioned embodiment, the configurations of the internal thread 51 and the external thread 52 are specified so that the thread engagement portion constituted by the internal thread 51 and the external thread 52 is inhibited from converting the axial movement of the rotation shaft 40 into the rotation thereof.

Accordingly, the load range in which the guide plate 54 maintains the engagement between the concavo-convex portions 43 and 44 may be stabilized. As a result, the input load to the ottoman 10 may be further appropriately supported.

A second embodiment will be explained with reference to FIGS. 21 to 32. The same configurations of the second embodiment as those of the first embodiment bear the same numeral references and explanation thereof is omitted.

Figure 21:
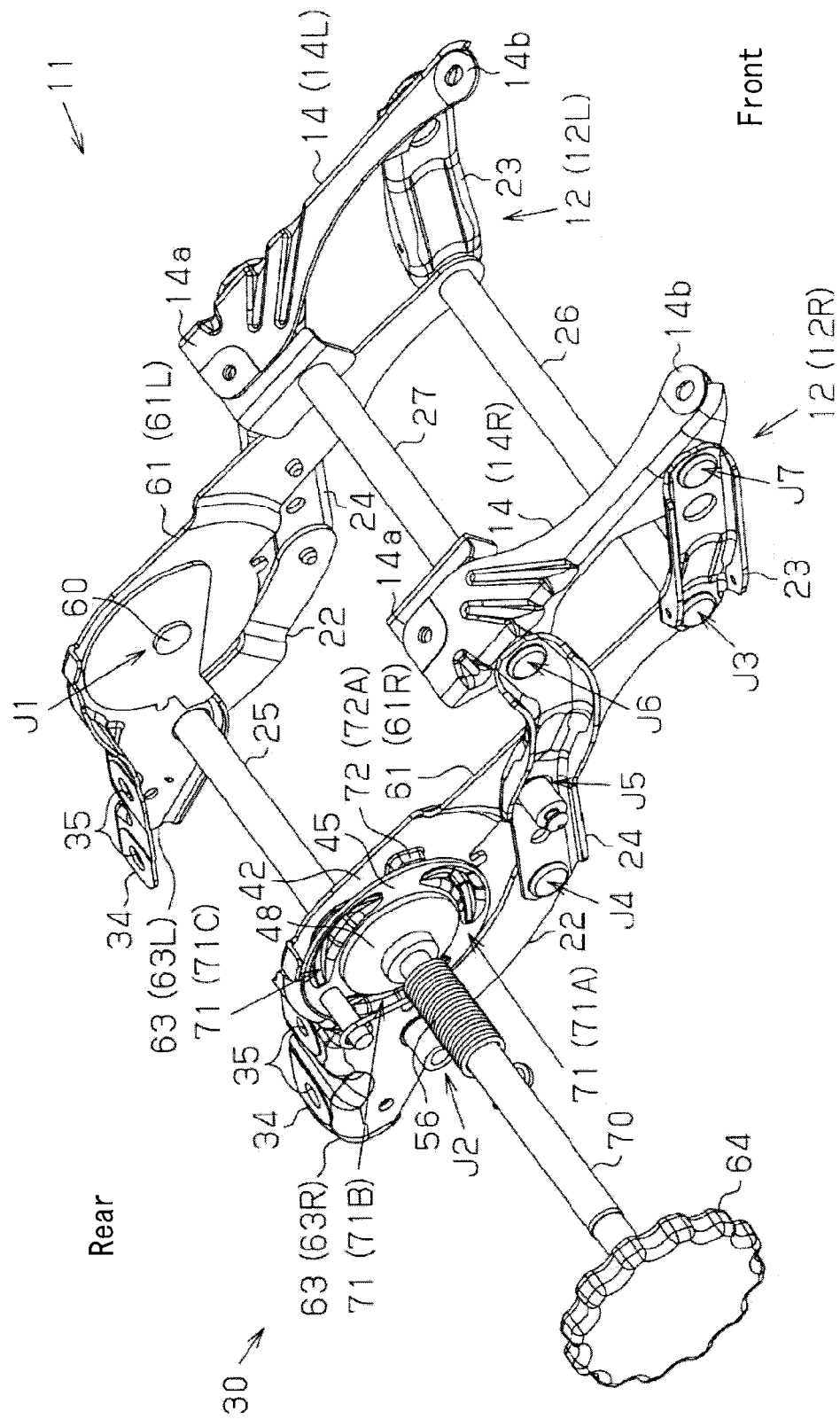
FIG. 21 is a perspective view of the ottoman device according to the second embodiment.
Figure 22:
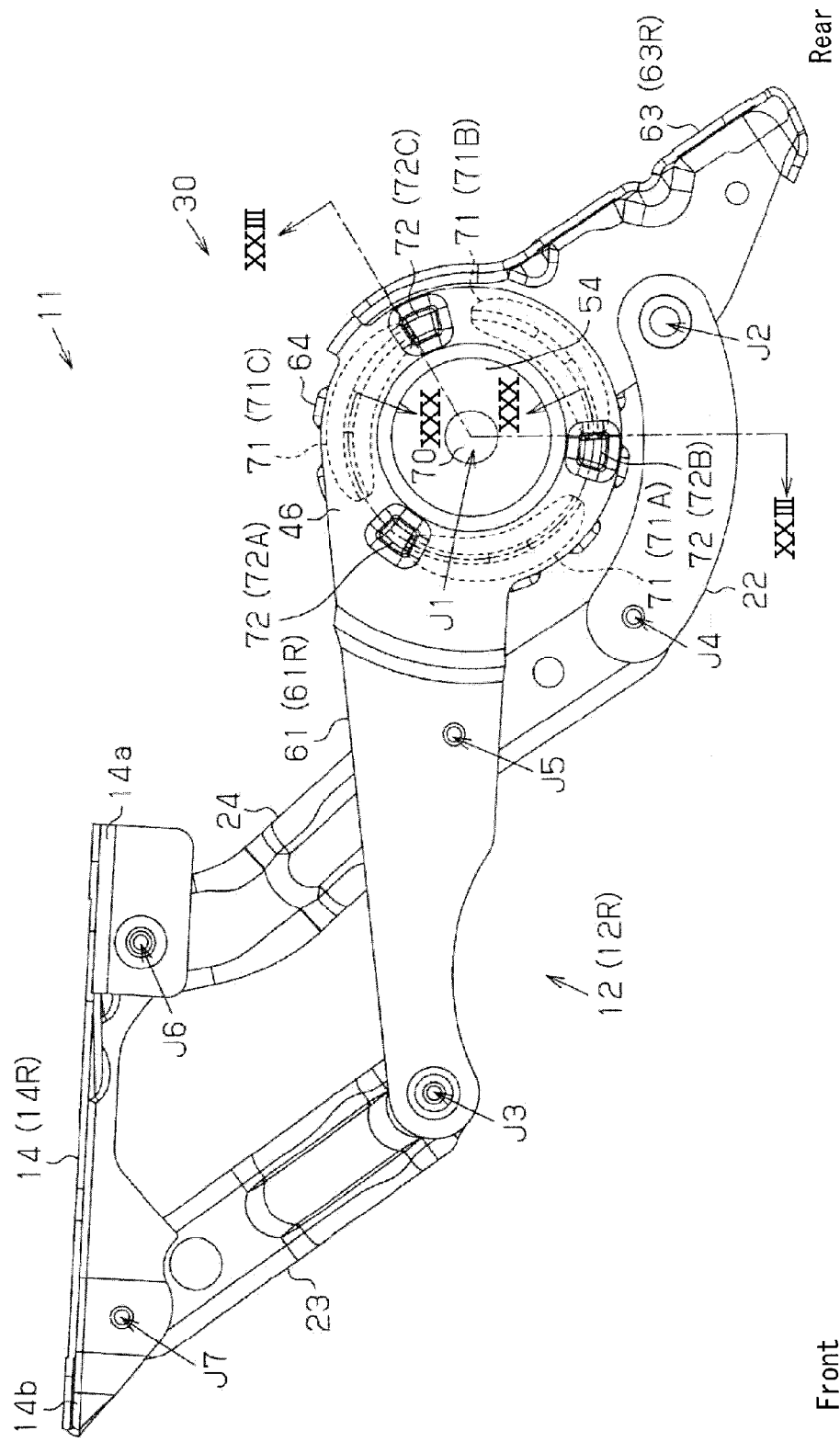
FIG. 22 is a side view of the ottoman device when the ottoman is in the fully deployed state according to the second embodiment.
Figure 23:
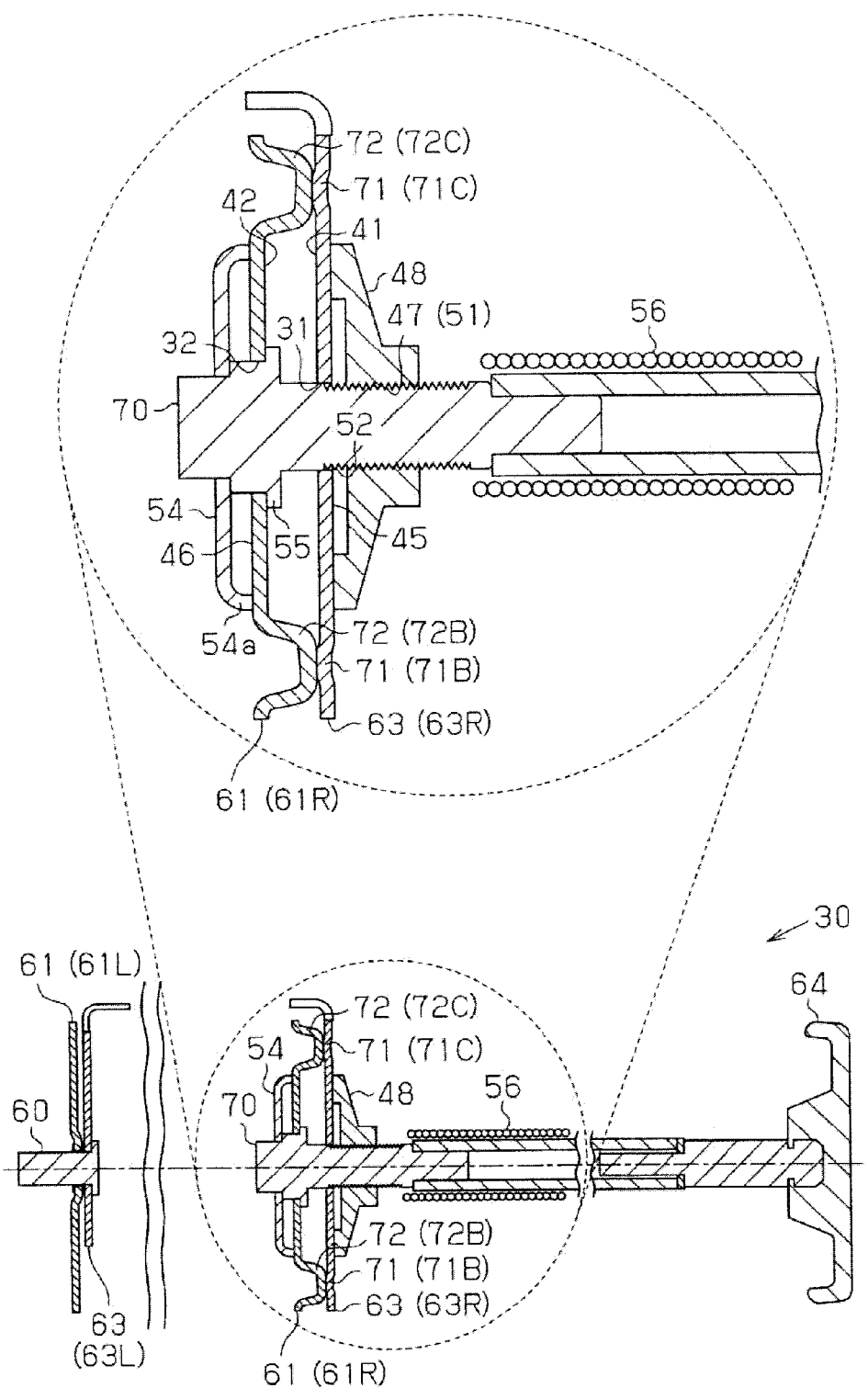
FIG. 23 is a cross-sectional view of the lock mechanism taken along line XXIII-XXIII in FIG. 22.

As illustrated in FIGS. 21 to 23, the ottoman device 11 according to the second embodiment differs from the first embodiment in configurations of the lock mechanism 30. The illustration of the coil spring 28 is omitted from FIGS. 21 and 22 for convenience of explanation.

As illustrated in FIGS. 21 and 23, first rotation links 61 each serving as the rotation link, i.e., left and right first rotation links 61L and 61R, constituting the left and right link mechanisms 12L and 12R are connected to respective base brackets 63, i.e., left and right base brackets 63L and 63R.

Specifically, the left first rotation link 61L positioned at the left side in FIG. 23 is connected to the left base bracket 63L via the first joint J1 formed by a pin-type rotation shaft 60 including a short axial length. On the other hand, the right first rotation link 61R positioned at the right side of the left first rotation link 61L in FIG. 23 is connected to the right base bracket 63R via the first joint J1 formed by a bar-like rotation shaft 70 (operation portion) extending to a side of the ottoman device 11, i.e., to a right side in FIG. 23. The lock mechanism 30 according to the second embodiment is configured to restrict the rotation of the right first rotation link 61R relative to the right base bracket 63R.

The right base bracket 63R (which will be hereinafter simply referred to as the base bracket 63R) and the right first rotation link 61R (which will be hereinafter simply referred to as the first rotation link) are formed of metal plate. In the second embodiment, the connection bars 25, 26, and 27 forming the joints J2, J3, and J6 are arranged to extend between the left and right link mechanisms 12L and 12R in the same way as the first embodiment. As a result, the left and right link mechanisms 12L and 12R operate as a unit.

As illustrated in FIG. 23, in the same way as the first embodiment, the connection member 48 including the through-hole 47 of which the inner periphery is formed by the internal thread 51 is fixed to the rear surface 45 of the base bracket 63R. The external thread 52 engaging with the internal thread 51 is formed at the outer periphery of the rotation shaft 70. That is, the rotation shaft 70 is supported by the base bracket 63R via the thread engagement portion constituted by the internal thread 51 and the external thread 52. The rotation shaft 70 is movable relative to the base bracket 63R in the axial direction based on the thread engagement relation (screw pair).

According to the present embodiment, the configurations of the internal thread 51 and the external thread 52 are determined so that the thread engagement portion constituted by the internal thread 51 and the external thread 52 is inhibited from converting the axial movement of the rotation shaft 70 into the rotation of the rotation shaft 70, i.e., inhibited from transmitting the reverse input.

In addition, the guide plate 54 is fixed to the rotation shaft 70 to slidably contact the rear surface 46 of the first rotation link 61R. The flange portion 55 is also formed at the rotation shaft 70 so as to slidably contact the facing surface 42 of the first rotation link 61R. The relative movement of the first rotation link 61R relative to the rotation shaft 70 in the axial direction thereof is restricted by the guide plate 54 and the flange portion 55.

In the same way as the first embodiment, the first rotation link 61R integrally moves with the rotation shaft 70 in the axial direction when the rotation shaft 70 rotates. As a result, the relative position of the first rotation link 61R relative to the base bracket 63R in the axial direction is changed.

Further, the torsion coil spring 56 is arranged at the outer periphery of the rotation shaft 70 to be loosely fitted to the outer periphery. The rotation shaft 70 is biased to rotate in a direction in which the first rotation link 61R comes close to and approaches the base bracket 63R based on the elastic force of the torsion coil spring 56. An operation handle 64 serving as the operation member is fixed to one end of the rotation shaft 70, i.e., a right end portion in FIG. 23, for rotating the rotation shaft 70. Then, first engagement projection portions 71 and second engagement projection portions 72 are formed at the facing surfaces 41 and 42 of the first rotation link 61R and the base bracket 63R respectively, the facing surfaces 41 and 42 being formed at the peripheral edge of the rotation shaft 70. The first engagement projection portions 71 and the second engagement projection portions 72 engage with one another to restrict the rotation of the first rotation link 61R. That is, the first engagement projection portions 71 and the second engagement projection portions 72 serve as the engagement portions.

Figure 24:
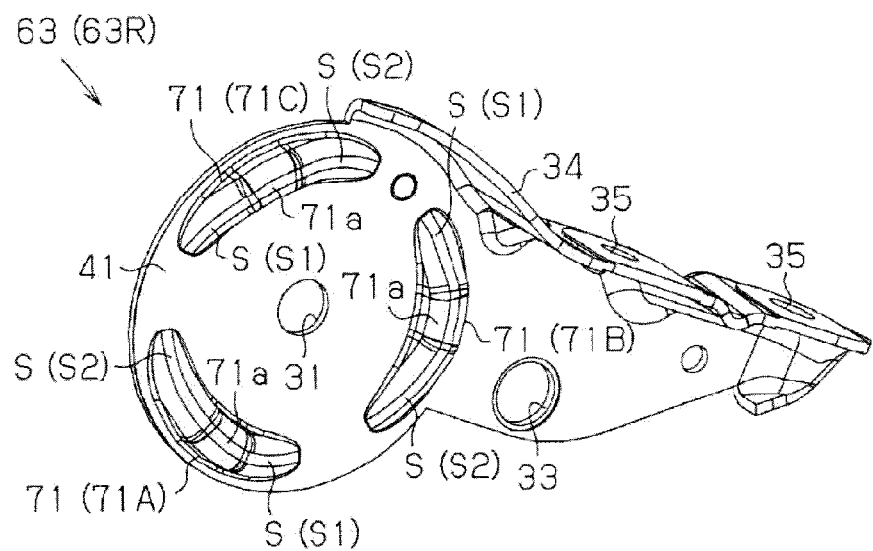
FIG. 24 is a perspective view of the base bracket according to the second embodiment.
Figure 25:
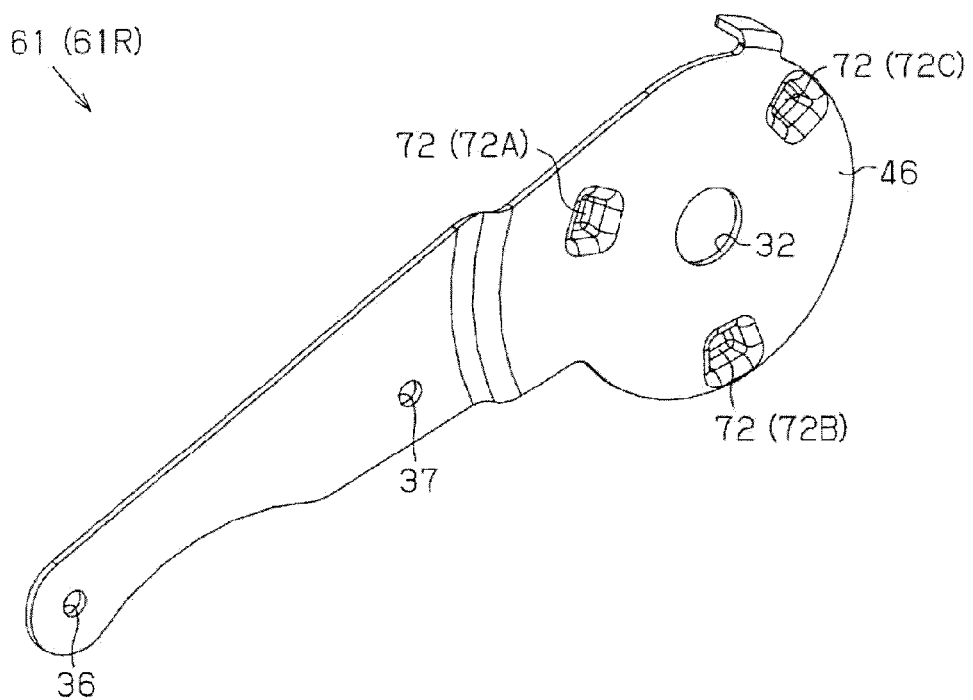
FIG. 25 is a perspective view of the first rotation link according to the second embodiment.

Specifically, as illustrated in FIGS. 23 and 24, the first engagement projection portions 71, each extending in an arc form in the circumferential direction, are formed at the facing surface 41 of the base bracket 63R so as to be positioned at the peripheral edge of the through-hole 31 into which the rotation shaft 70 is inserted. In addition, as illustrated in FIGS. 23 and 25, the second engagement projection portions 72 engageable with the first engagement projection portions 71 depending on the rotation direction of the first rotation link 61R are formed at the facing surface 42 of the first rotation link 61R. According to the present embodiment, the first engagement projection portions 71 of the base bracket 63R and the second engagement projection portions 72 of the first rotation link 61R are formed by press working. FIG. 25 illustrates the rear surface 46 of the first rotation link 61R serving as a rear side of the facing surface 42. In FIG. 25, the second engagement projection portions 72 appear as plural concave portions formed at the rear surface 46 by press working. As illustrated in FIGS. 24 and 25, the first engagement projection portions 71 of the base bracket 63R are formed at plural portions, specifically, three portions, around the rotation shaft 70 (around the through-hole 31) at intervals in the circumferential direction. In the same way, the second engagement projection portions 72 of the first rotation link 61R are formed at plural portions, specifically, three portions, around the rotation shaft 70 (around the through-hole 32) at intervals in the circumferential direction.

Figure 26A:
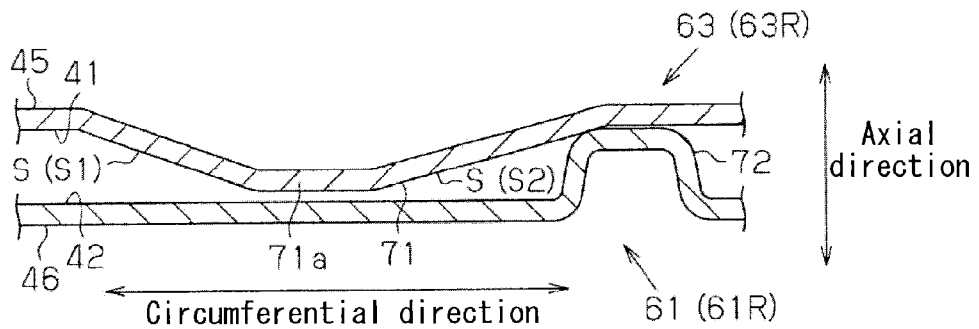
FIG. 26A is a cross-sectional view of a first engagement projection portion and a second engagement projection portion in an engagement state according to the second embodiment.
Figure 26B:
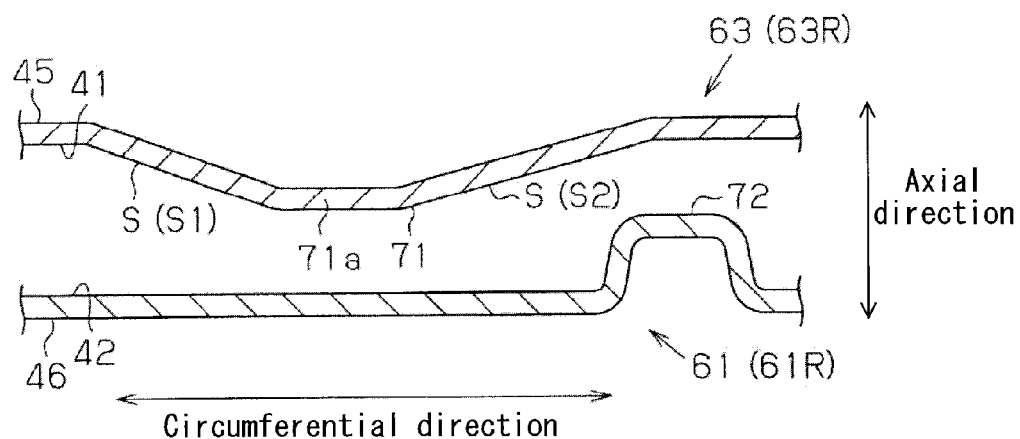
FIG. 26B is a cross-sectional view of the first engagement projection portion and the second engagement projection portion in an engagement release state according to the second embodiment.

As illustrated in FIGS. 26A and 26B, each of the first engagement projection portions 71 includes a peak portion 71a including a maximum projection length at a substantially center portion in the circumferential direction. Then, the inclined surfaces S inclined in opposite directions from each other, i.e., a first inclined surface S1 and a second inclined surface S2, are formed at both sides of the peak portion 71a in the circumferential direction.

That is, the second engagement projection portion 72 of the first rotation link 21 engages with the first engagement projection portion 71 via either of the inclined surface S1 or S2 serving as the engagement surface depending on the rotation direction of the first rotation link 61R. The lock mechanism 30 of the present embodiment adjusts the relative position between the base bracket 63R and the first rotation link 61R in the axial direction so as to control the engagement state between the first engagement projection portions 71 and the second engagement projection portions 72.

As illustrated in FIG. 26A, in a case where the operation handle 64 provided at one end of the rotation shaft 70 is not operated, the first rotation link 61R is arranged at a position by moving in a direction in which the first rotation link 61R comes close to the base bracket 63R by the rotation of the rotation shaft 70 based on the elastic force of the torsion coil spring 56. In the aforementioned state, the first rotation link 61R rotates so that the second engagement projection portions 72 of the first rotation link 61R engage with the respective first engagement projection portions 71 of the base bracket 63R. As a result, the rotation of the first rotation link 61R relative to the base bracket 63R is restricted.

Figure 27:
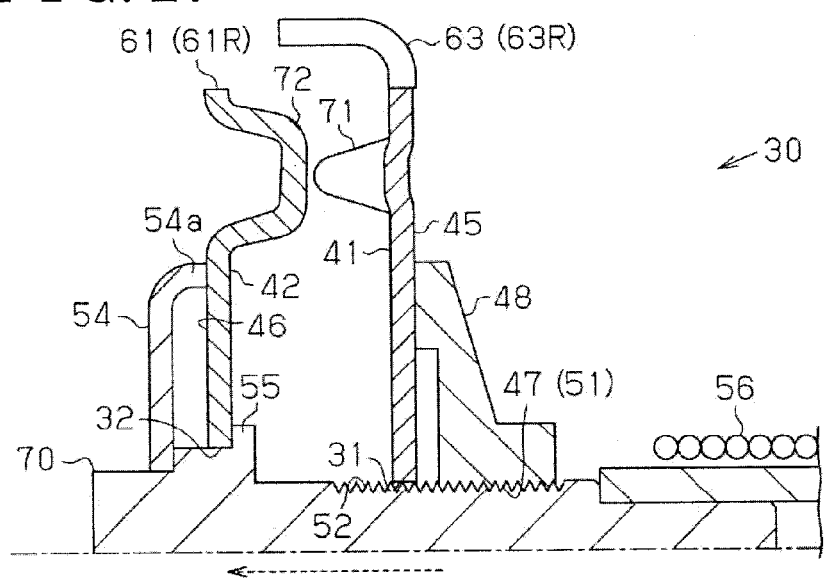
FIG. 27 is a cross-sectional view of the first and second engagement projection portions in the engagement release state obtained by the axial movement of the rotation shaft and the guide plate relative to the base bracket according to the second embodiment.

On the other hand, as illustrated in FIGS. 26B and 27, in a case where the operation handle 64 is operated against the elastic force of the torsion coil spring 56, the first rotation link 61R moves in the direction in which the first rotation link 61R together with the rotation shaft 70 is separated from the base bracket 63R. Accordingly, the first engagement projection portions 71 of the base bracket 63R and the second engagement projection portions 72 of the first rotation link 61R are inhibited from contacting, which results in the release of the engagement between the first engagement projection portions 71 and the second engagement projection portions 72. That is, the first and second engagement projection portions 71 and 72 are in an engagement release state. The rotation of the first rotation link 61R relative to the base bracket 63R is thus permitted.

When the user releases his/her hand from the operation handle 64, the rotation shaft 70 rotates in the direction where the first rotation link 61R comes close to the base bracket 63R based on the elastic force of the torsion coil spring 56. That is, the first engagement projection portions 71 of the base bracket 63R and the second engagement projection portions 72 of the first rotation link 61R are brought to a state to be engageable with one another. The lock mechanism 30 according to the present embodiment is configured to switch between the locked state and the unlocked state by the operation of the operation handle 64.

Figure 28:
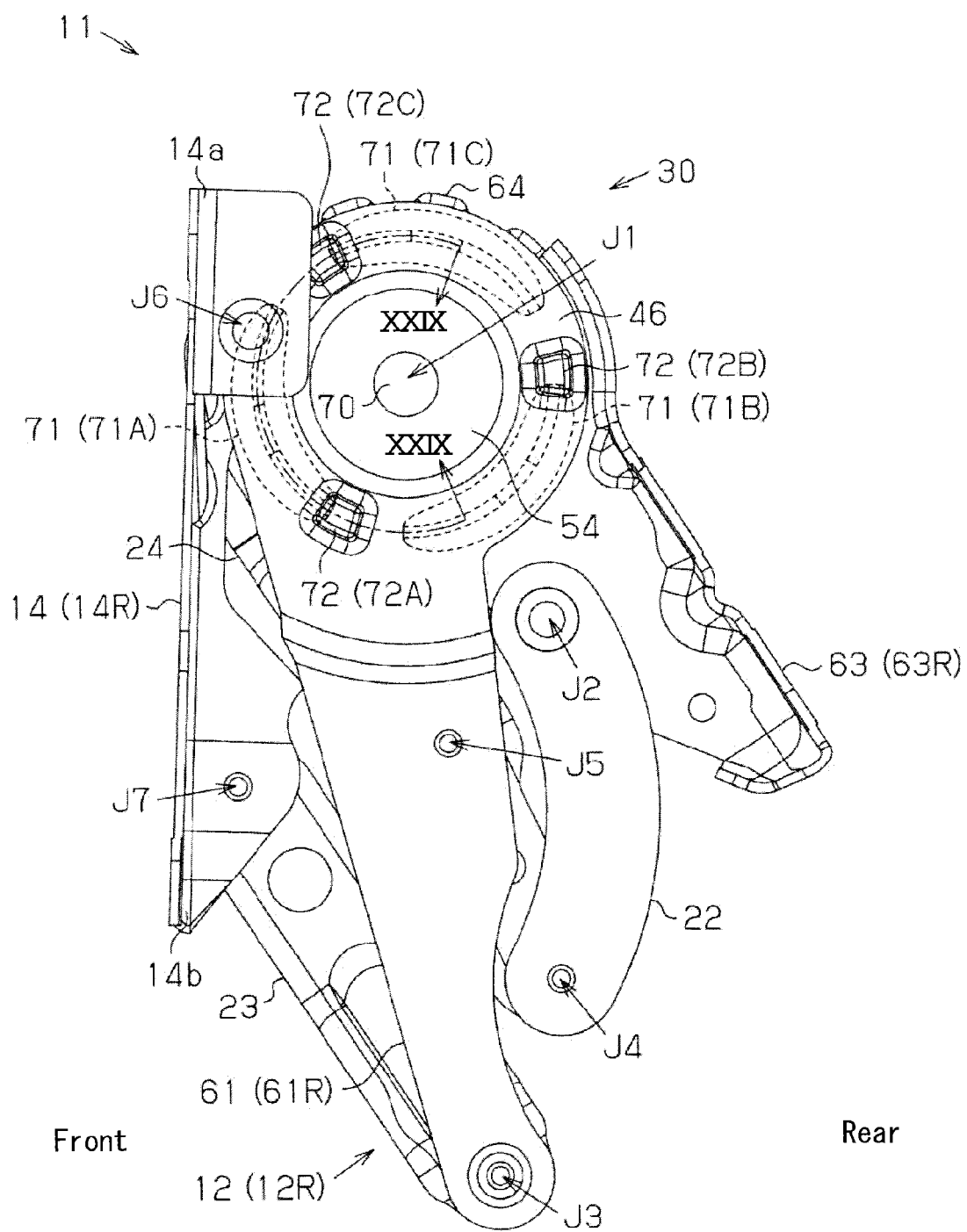
FIG. 28 is a side view of the ottoman device when the ottoman is in the retracted state according to the second embodiment.

Specifically, as illustrated in FIGS. 2 and 28, in a state where the ottoman 10 (the support brackets 14) is retracted to the front edge 2a of the seat cushion 2, the first rotation link 61R intends to rotate in the deployed direction based on the elastic force of the coil spring 28 (see FIG. 3) disposed between the connection bars 26 and 27 constituting the joints J3 and J6 respectively of each of the link mechanisms 12.

Figure 29:
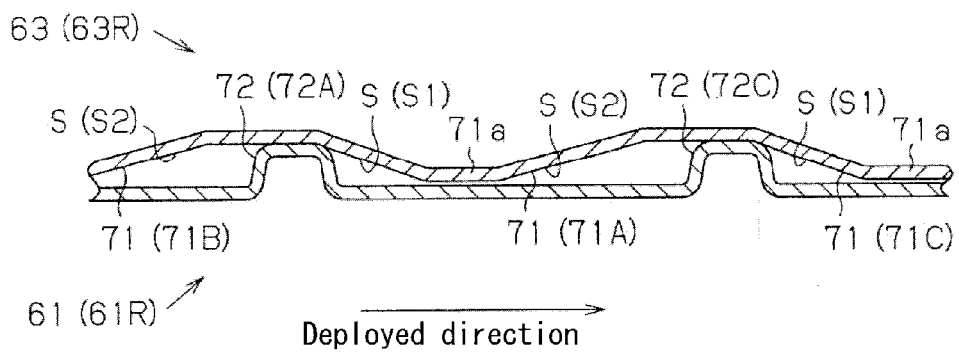
FIG. 29 is a cross-sectional view of the first engagement projection portion and the second engagement projection portion in the engagement state taken along line XXIX-XXIX in FIG. 28.

As illustrated in FIG. 29, according to the second embodiment, the second engagement projection portions 72 of the first rotation link 61R engage with the first engagement projection portions 71 of the base bracket 63R via the first inclined surfaces S1 serving as the engagement surfaces respectively by the rotation of the first rotation link 61R in the deployed direction. Specifically, as illustrated in FIG. 28, the second engagement projection portions 72, specifically, 72A, 72B, and 72C, of the first rotation link 61R engage with the respective first engagement projection portions 71, specifically, 71A, 71B, and 71C, of the base bracket 63R. As a result, the rotation of the first rotation link 61R in the deployed direction is restricted to thereby maintain and hold the retracted state of the ottoman 10.

Figure 30:
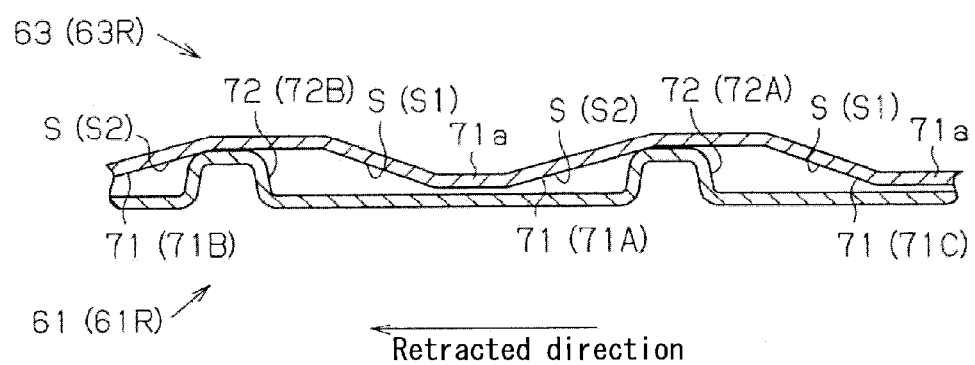
FIG. 30 is a cross-sectional view of the first engagement projection portion and the second engagement projection portion in the engagement state taken along line XXX-XXX in FIG. 22.

On the other hand, in a case where the ottoman 10 (the link mechanisms 12) is in the deployed state as illustrated in FIG. 22, the second engagement projection portions 72A, 72B, and 72C of the first rotation link 61R override or move beyond the first engagement projection portions 71A, 71B, and 71C of the base bracket 63R so as to be arranged at opposite positions relative to the peak portion 71a from positions in the retracted state of the ottoman 10. Then, as illustrated in FIG. 30, the first rotation link 61R rotates in the retracted direction based on the input load to the ottoman 10 so that the second engagement projection portions 72 of the first rotation link 61R engage with the first engagement projection portions 71 of the base bracket 63R via the second inclined surfaces S2 serving as the engagement surfaces.

That is, in a state where the ottoman 10 is in the deployed state, the rotation of the first rotation link 61R in the retracted direction based on the input load to the ottoman 10 is restricted. In a case where no load is input to the ottoman 10, the ottoman 10 moves in the deployed direction based on the elastic force of the coil spring 28. Then, according to the ottoman device 11 of the present embodiment, the ottoman 10 supported by the end portions of the link mechanisms 12 is maintainable in the deployed state in a state where the deployed position defined by the engagement between the first engagement projection portions 71 and the second engagement projection portions 72 via the engagement surfaces constituted by the second inclined surfaces S2 serves as a lowest point.

Figure 31:
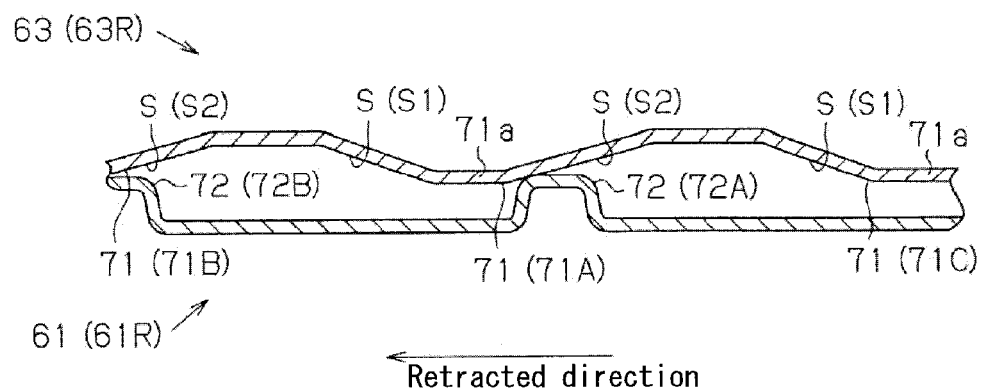
FIG. 31 is a cross-sectional view of the first engagement projection portion and the second engagement projection portion in the engagement state taken along line XXXI-XXXI in FIG. 32.

As illustrated in FIG. 31, the relative position between the base bracket 63R and the first rotation link 61R in the axial direction changes to thereby change the engagement state between the first engagement projection portions 71 of the base bracket 63R and the second engagement projection portions 72 of the first rotation link 61R. Specifically, the engagement position of each of the second engagement projection portions 72 relative to the second inclined surface S2 of each of the first engagement projection portions 71 moves towards the peak portion 71a in association with an increase of the distance between the first rotation link 61R and the base bracket 63R.

Figure 32:
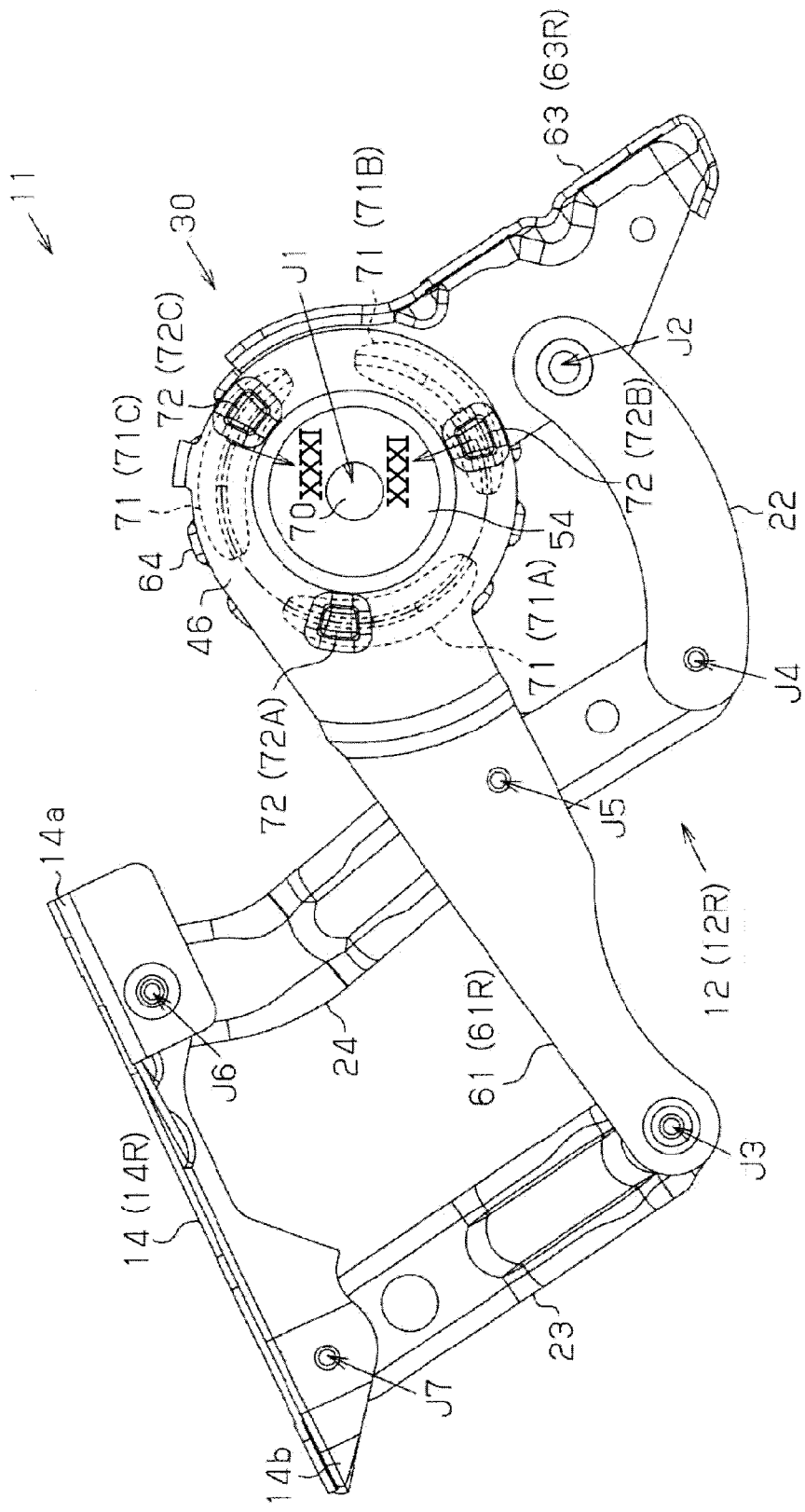
FIG. 32 is a side view of the ottoman device when the ottoman is in the deployed state (retracted direction moved state) according to the second embodiment.

Accordingly, the lock mechanism 30 of the present embodiment may finely adjust the relative position between the base bracket 63R and the first rotation link 61R in the axial direction by the operation handle 64 provided at the rotation shaft 70. Then, the ottoman device 11 of the embodiment moves the position at which the rotation of the first rotation link 61R is restricted on a basis of the engagement between the first engagement projection portions 71 and the second engagement projection portions 72. As a result, as illustrated in FIG. 32, the ottoman device 11 may change the deployed position (the lowest point) of the ottoman 10 in the deployed state (in a retracted direction moved state).

At this time, the second engagement projection portions 72 of the first rotation link 61R engage with the first engagement projection portions 71 of the base bracket 63R via the inclined surfaces S, specifically, the second inclined surfaces S2, to thereby generate a force between the base bracket 63R and the first rotation link 61R in a direction in which the first rotation link 61R and the base bracket 63R are separated from each other based on the load input to the ottoman 10 (see FIG. 19). According to the second embodiment, in the same way as the first embodiment, the guide plate 54 serving as the restriction portion is deflected or bent in the direction separating from the base bracket 63R (i.e., to the left side in FIG. 23) in a case where the input load to the ottoman 10 is excessive.

That is, as illustrated in FIG. 31, the first rotation link 61R moves relative to the base bracket 63R in the direction separating from the base bracket 63R so that the engagement position of each of the second engagement projection portions 72 relative to the inclined surface S (the second inclined surface S2) of the first engagement projection portion 71 moves towards the peak portion 71a. Then, the second engagement projection portion 72 overrides or moves beyond the peak portion 71a of the first engagement projection portion 71 to thereby release the engagement between the first engagement projection portion 71 and the second engagement projection portion 72.

According to the ottoman device 11 of the second embodiment, the ottoman 10 may be maintained and held in the deployed state in the load range in which the guide plate 54 restricts the relative movement between the base bracket 63R and the first rotation link 61R in the axial direction so that the engagement state between the first engagement projection portions 71 and the second engagement projection portions 72 is maintained and held. In a case where the excessive load beyond an acceptable range of the guide plate 54 is input to the ottoman 10, the engagement between the first engagement projection portions 71 and the second engagement projection portions 72 is released. Then, the movement of the ottoman 10 in the retracted direction releases the excessive input load to the ottoman 10.

According to the aforementioned second embodiment, the first rotation link 61R is connected to the base bracket 63R via the rotation shaft 70 and is inhibited from axially moving relative to the base bracket 63R in the direction separating from the base bracket 63R by the guide plate 54 that slidably contacts the rear surface 46 of the first rotation link 61R. In addition, the first engagement projection portions 71, each including the first inclined surface S1 and the second inclined surface S2 inclined in the opposite directions from each other relative to the peak portion 71a in the circumferential direction, are formed at the facing surface 41 of the base bracket 63R. The second engagement projection portions 72 engaging with the first engagement projection portions 71 are formed at the facing surface 42 of the first rotation link 61R in a state where either the inclined surfaces S1 or S2 serve as the engagement surfaces depending on the rotation direction of the first rotation link 61R.

Accordingly, the ottoman 10 supported at the end portions of the link mechanisms 12 may be maintained and held in the deployed state in the load range in which the guide plate 54 serving as the restriction portion restricts the relative movement between the base bracket 63R and the first rotation link 61R in the axial direction so that the engagement state between the first engagement projection portions 71 and the second engagement projection portions 72 is maintained. As a result, the effect same as the first embodiment may be obtained.

The first inclined surface S1 and the second inclined surface S2 inclined opposite from each other in the circumferential direction are formed at the respective sides of the peak portion 71a in the circumferential direction. Therefore, the rotations in two directions, i.e., in the deployed direction and the retracted direction, may be restricted by the first engagement projection portions 71.

The engagement position of each of the second engagement projection portions 72 relative to the second inclined surface S2 of the first engagement projection portion 71 moves towards the peak portion 71a while the first rotation link 61R is separating from the base bracket 63R. That is, the relative position between the base bracket 63R and the first rotation link 61R in the axial direction is finely adjusted to thereby move the position at which the rotation of the first rotation link 61R is restricted on a basis of the engagement between the first engagement projection portions 71 and the second engagement projection portions 72. As a result, the deployed position of the ottoman 10 may be adjusted.

The aforementioned embodiments may be changed or modified as follows. According to the aforementioned first and second embodiments, the guide plate 54 serving as the restriction portion is configured to allow the relative movement between the first rotation link 21, 61R and the base bracket 13, 63R based on the deflection of the guide plate 54 when the excessive load is input to the ottoman 10. In this case, however, the load range in which the engagement state between the engagement portions, for example, between the concavo-convex portions 43 and 44 or between the first and second engagement projection portions 71 and 72 is maintainable by the restriction of the relative movement between the first rotation link 21, 61R and the base bracket 13, 63R may be specified on a basis of a spring force or a frictional engagement force, for example, instead of the aforementioned deflection of the guide plate 54.

Figure 33:
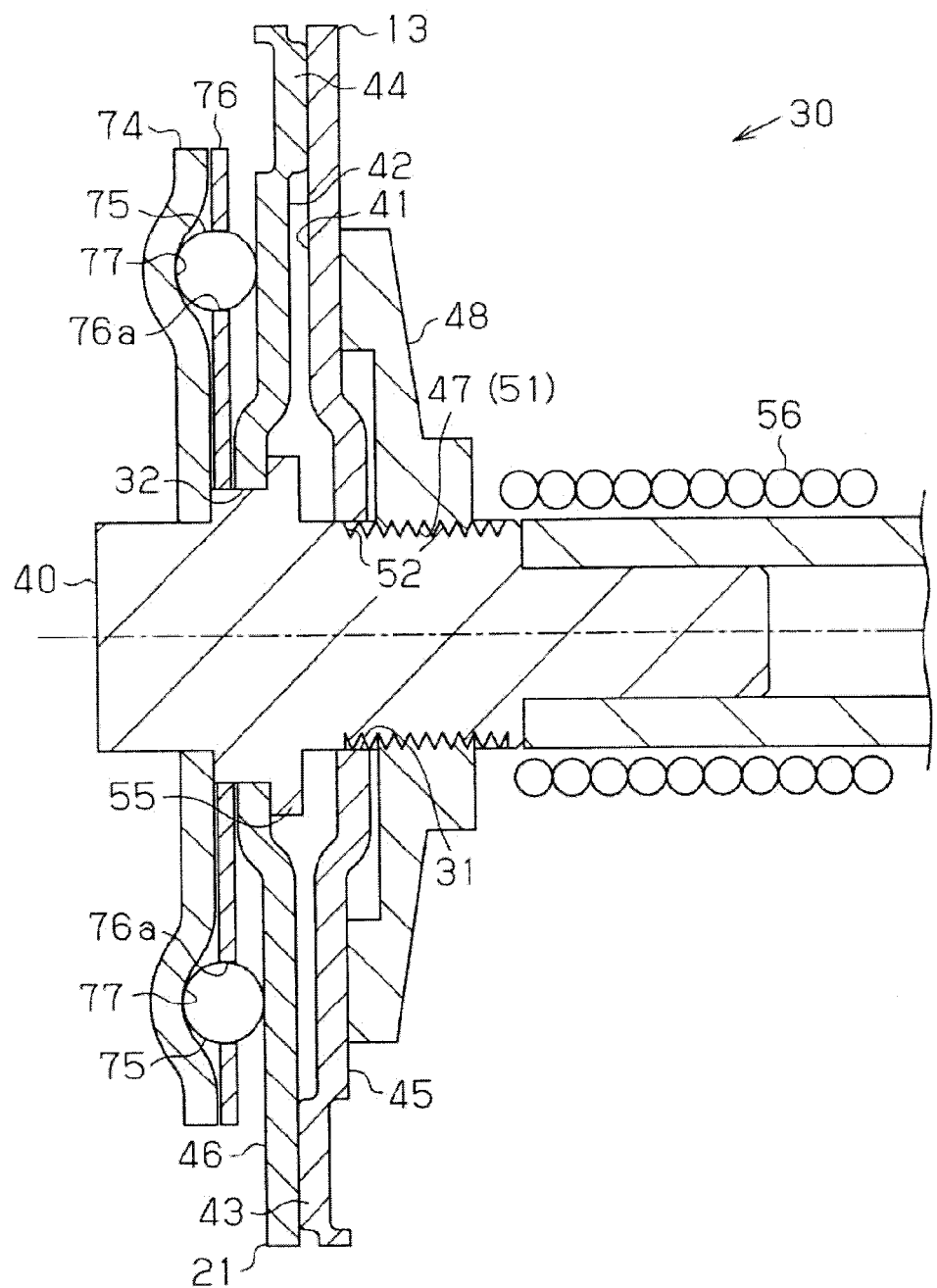
FIG. 33 is a cross-sectional view of a guide plate according to an alternate example of the first and second embodiments.

According to the aforementioned first and second embodiments, the guide plate 54 is formed in a substantially flat cup. In addition, the end portion of the annular peripheral wall portion 54a is slidably in contact with the rear surface 46 of the first rotation link 21, 61R. Alternatively, as illustrated in FIGS. 33 and 34, balls 75 serving as rolling members may be disposed between a guide plate 74 and the first rotation link 21.

Figure 34:
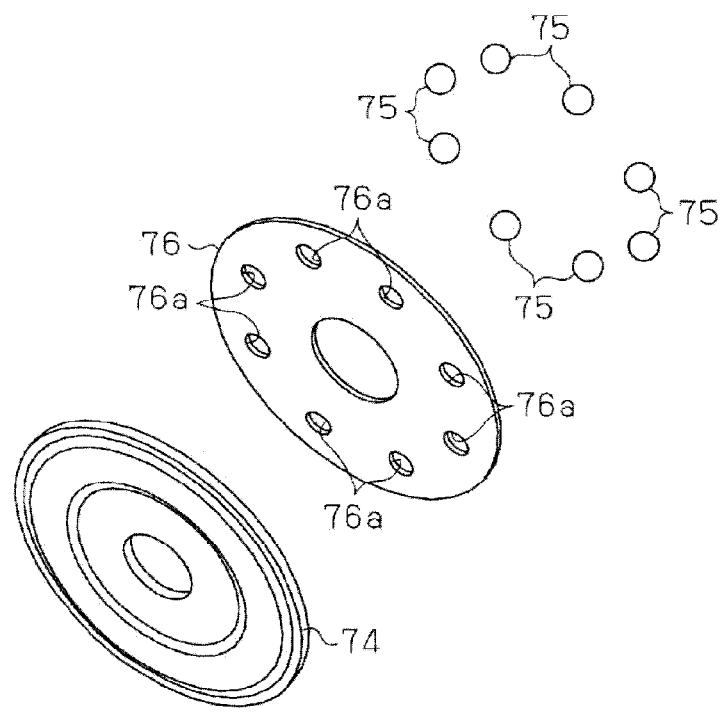
FIG. 34 is a perspective view of the guide plate, rolling members, and a retention plate according to another alternate example of the first and second embodiments.

Specifically, as illustrated in FIG. 34, the guide plate 74 is formed in a substantially disc form. In addition, a disc-formed retention plate 76 including plural through-holes 76a is coaxially arranged between the guide plate 74 and the first rotation link 21. The balls 75 are held within the respective through-holes 76a. Annular groove portions 77 (see FIG. 33) are provided at the guide plate 74 so that each of the groove portions 77 serves as a path or a track on which each of the balls 75 rolls.

Figure 35:
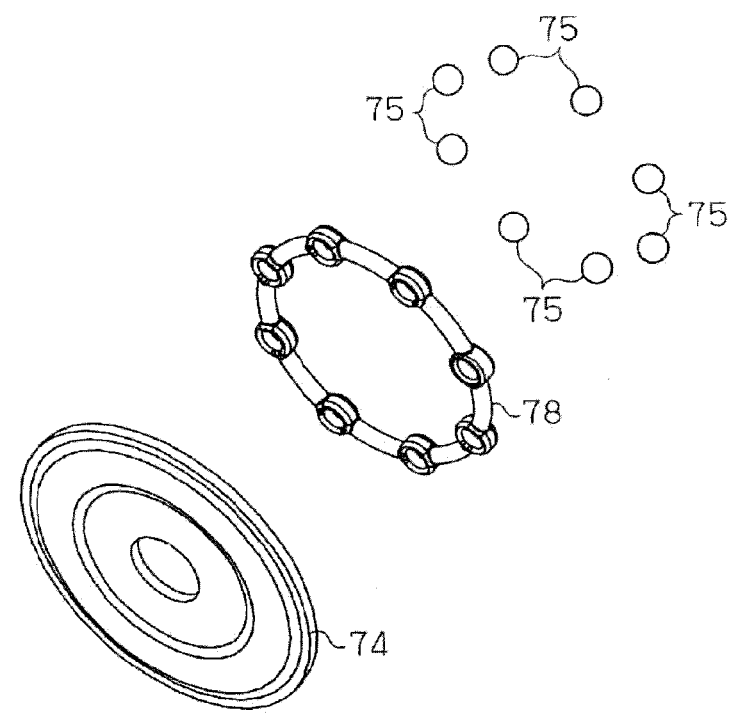
FIG. 35 is a perspective view of the guide plate, the rolling members, and a retainer according to still another alternate example of the first and second embodiments.

That is, in a state where the guide plate 74 and the first rotation link 21 rotate relative to each other, the balls 75 disposed between the guide plate 74 and the first rotation link 21 roll. Thus, a friction between the guide plate 74 and the first rotation link 21 is reduced to thereby smoothly rotate the first rotation link 21 while restricting the axial movement of the first rotation link 21. As illustrated in FIG. 35, a known retainer 78 serving as a bearing may be used for holding the balls 75. In addition, instead of the balls 75, other rolling members such as rollers, for example, may be used. The number of rolling members may be arbitrarily specified.

According to the aforementioned first and second embodiments, the guide plate 54 is fixed to the rotation shaft 40, 70. Then, the operation lever 57 or the operation handle 64 is provided at one end of the rotation shaft 40, 70 to thereby form the operation portion. Alternatively, the restriction portion and the operation portion may be independently formed from the rotation shaft. In such case, as long as the first rotation link 21, 61R and the restriction portion (guide plate) 54 are relatively rotatable, the configuration in which the rolling members are disposed between the first rotation link 21, 61R and the restriction portion 54 may be effective.

According to the aforementioned first and second embodiments, the rotation shaft 40, 70 and the guide plate 54 move in the axial direction by utilizing the thread engagement relation (screw pair) between the internal thread 51 and the external thread 52. Alternatively, the rotation shaft 40, 70 and the guide plate 54 may move directly, i.e., without the usage of the thread engagement relation, in the axial direction. In such case, means for fixing the relative position of the rotation shaft 40, 70 and the guide plate 54 relative to the base bracket 13, 63R may be provided.

According to the aforementioned first and second embodiments, the engagement portions are formed at the plural portions of the first rotation link 21, 61R around the rotation shaft 40, 70 (i.e., the through-hole 31) at intervals in the circumferential direction while the engagement portions are formed at the plural portions of the base bracket 13, 63R around the rotation shaft 40, 70 (i.e., the through-hole 32) at intervals in the circumferential direction. Alternatively, one engagement portion may be formed at one portion of the first rotation link 21, 61R while one engagement portion may be formed at one portion of the base bracket 13, 63R. Further alternatively, the engagement portions may be formed at the plural portions of one of the first rotation link 21, 61R and the base bracket 13, 63R and formed at one portion of the other of the first rotation link 21, 61R and the base bracket 13, 63R. According to the first embodiment, at least one of the concavo-convex portions 43 and 44 may be arranged around the rotation shaft 40 over an entire circumference. According to the second embodiment, one first engagement projection portion 71 and one second engagement projection portion 72 may be formed.

According to the second embodiment, the first engagement projection portions 71 are formed at the base bracket 63R while the second engagement projection portions 72 are formed at the first rotation link 61R. Alternatively, the first engagement projection portions 71 may be formed at the first rotation link 61R while the second engagement projection portions 72 may be formed at the base bracket 63R.

According to the aforementioned first and second embodiments, the rotation of the first rotation link 21, 61R is restricted by the engagement between the engagement portions at the base bracket 13, 63R, i.e., the concavo-convex portions 43 or the first engagement projection portions 71 and the engagement portions at the first rotation link 21, 61R, i.e., the concavo-convex portions 44 or the second engagement projection portions 72. Thus, the deployed position of the ottoman 10 (the link mechanisms 12) is maintained and held. In addition, the guide plate 54, 74 (the restriction portion) moves in the axial direction by the operation lever 57 or the operation handle 64 to a point at which the concavo-convex portions 43 or the first engagement projection portions 71 of the first rotation link 21, 61R and the concavo-convex portions 44 or the second engagement projection portions 72 of the base bracket 13, 63R are inhibited from making contact with one another. As a result the engagement between the concavo-convex portions 43 or the first engagement projection portions 71 of the first rotation link 21, 61R and the concavo-convex portions 44 or the second engagement projection portions 72 of the base bracket 13, 63R is released. The deployed position of the ottoman 10 is adjustable accordingly.

In addition, the concavo-convex portions 43 engage with the concavo-convex portions 44 via the inclined surfaces S serving as the engagement surfaces. Then, the forces F1 and F2 are applied to the base bracket 13 and the first rotation link 21 in the directions in which the base bracket 13 and the first rotation link 21 are separated from each other on a basis of the load input to the ottoman 10. The guide plate 54 restricts the relative movement between the base bracket 13 and the first rotation link 21 in the axial direction against the forces F1 and F2 for separating the base bracket 13 and the first rotation link 21 from each other. The engagement between the concavo-convex portions 43 and 44 is maintained and held accordingly.

In a case where the excessive load beyond a capacity of the guide plate 54, 74 is input to the ottoman 10 by an occupant seated on the ottoman 10 or the occupant placing one knee on the ottoman 10, for example, the engagement between the concavo-convex portions 43 and 44 or between the first and second engagement projection portions 71 and 72 is released.

The ottoman 10 then moves in the retracted direction so that the excessive input load is released. Further, a fact that the occupant uses the ottoman 10 in an inappropriate way may be notified to the occupant via the operation of the ottoman 10 moving in the retracted direction and the occupant may be urged to stop such inappropriate usage. As a result, a load applied to the components of the ottoman device 11, for example, to the links 21 to 24, 61, 63 and the joints J1 to J7 connecting the links 21 to 24, 61, 63 may be reduced. Rigidity necessary for the aforementioned components of the ottoman device 11 decreases to thereby obtain reduced cost and weight.

According to the aforementioned first and second embodiments, at least one of the engagement portions (the concavo-convex portions 43 or the concavo-convex portions 44, the first engagement projection portions 71 or the second engagement projection portions 72) formed at the facing surfaces 41 and 42 of the rotation link 21, 61R and the base bracket 13, 63R includes plural engagement portions at the peripheral edge of the rotation shaft 40, 70 at intervals in the circumferential direction of the rotation shaft 40, 70.

Accordingly, the engagement force between the concavo-convex portions 43 and 44 or between the first and second engagement projection portions 71 and 72 may be generated around the rotation shaft 40, 70 in a balanced manner. As a result, even in a case where the load is input to the ottoman 10 unevenly or non-uniformly, the deployed position of the ottoman 10 may be stably held.

Each of the engagement portions includes the concavo-convex portion 43, 44 in a wavy form formed around the rotation shaft 40.

Accordingly, the engagement position between the concavo-convex portions 43 and 44 is finely adjustable. As a result, the deployed position of the ottoman 10 may be more finely adjustable. In addition, the ottoman device 11 may be simply configured and easily formed.

The facing surface 41 is formed by the first engagement projection portion 71 including the first inclined surface S1 and the second inclined surface S2 inclined in the opposite directions from each other relative to the peak portion 71a, and the facing surface 42 is formed by the second engagement projection portion 72 being contactable and engageable with one of the first inclined surface S1 and the second inclined surface S2 of the first engagement projection portion 71 depending on the rotation direction of the rotation link 61R.

Accordingly, the usage of the first inclined surface S1 and the second inclined surface S2 inclined in opposite directions from each other may result in the restriction of the rotation of the first rotation link 61R in two directions, i.e., to the deployed side and the retracted side, by the single first engagement projection portion 71. In addition, the engagement position of the second engagement projection portion 72 facing the inclined surface S1 or S2 of the first engagement projection portion 71 moves towards the peak portion 71a in association with an increase of the distance between the first rotation link 61R and the base bracket 63R. That is, the relative position between the first rotation link 61R and the base bracket 63R in the axial direction is adjusted to thereby move the position at which the rotation of the first rotation link 61R is restricted on a basis of the engagement between the first and second engagement projection portions 71 and 72. Accordingly, the deployed position of the ottoman 10 may be adjusted.

The rotation shaft 40, 70 is provided to be axially movable relative to the base bracket 13, 63R and the guide plate 54, 74 is fixed to the rotation shaft 40, 70 to be axially unmovable relative to the rotation shaft 40, 70.

Accordingly, the operation of the rotation shaft 40, 70 may lead to the integral movement of the rotation shaft 40, 70 and the guide plate 54, 74 in the axial direction. As a result, the rotation shaft 40, 70 (operation portion) may be formed by a simple configuration.

The rotation shaft 40, 70 is supported by the base bracket 13, 63R via the thread engagement portion, i.e., the internal thread 51 and the external thread 52, and the operation lever 57 or the operation handle 64 is provided at the rotation shaft 40, 70 for rotating the rotation shaft 40, 70.

The rotation shaft 40, 70 is rotated by the operation of the operation lever 57 or the operation handle 64. Accordingly, the rotation shaft 40, 70 may integrally move with the guide plate 54, 74 in the axial direction based on the thread engagement relation (screw pair). Thus, the operating force of the operation lever 57 or the operation handle 64 may be reduced. In addition, the rotation shaft 40, 70 is arranged to extend in the width direction of the seat 1 in view of the configurations of the ottoman device 11. Accordingly, the operation lever 57 or the operation handle 64 provided at one end of the rotation shaft 40, 70 may obtain an improved operability.

The thread engagement portion, i.e., the internal thread 51 and the external thread 52, is configured to be inhibited from converting the axial movement of the rotation shaft 40, 70 into the rotation of the rotation shaft 40, 70.

Accordingly, the guide plate 54, 74 may stabilize the load range in which the engagement state between the concavo-convex portions 43 and 44 or between the first and second engagement projection portions 71 and 72 is maintainable. As a result, the input load to the ottoman 10 may be further appropriately supported.

The guide plate 74 is rotatable relative to the rotation link 21, and the balls 75 are disposed between the rotation link 21 and guide plate 74.

The balls 75 disposed between the guide plate 74 and the first rotation link 21 roll when the guide plate 54 and the first rotation link 21 rotate relative to each other. Accordingly, a friction between the guide plate 74 and the first rotation link 21 is reduced to thereby smoothly rotate the first rotation link 21 while restricting the axial movement of the first rotation link 21.

According to the aforementioned embodiments, the ottoman device 11 that may overcome the excess load input is obtainable without an increase of a size and a weight of the ottoman device 11.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An ottoman device comprising:
a base bracket configured to be arranged at a front edge of a seat;
a link mechanism supporting an ottoman and including a rotation link connected to the base bracket via a rotation shaft, the link mechanism selectively causing the ottoman to be deployed forward of the seat and to be retracted to the front edge of the seat based on a rotation of the rotation link;

engagement portions formed at facing surfaces that are formed on surfaces of the rotation link and the base bracket respectively and engaging with each other to restrict the rotation of the rotation link, at least one of the engagement portions including an inclined surface serving as an engagement surface;

a restriction portion restricting a relative axial movement between the rotation link and the base bracket in a direction in which the rotation link is separated from the base bracket in a load range where an engagement state between the engagement portions is maintainable; and an operation portion configured to change a relative position between the rotation link and the base bracket by moving the restriction portion in an axial direction of the rotation shaft, wherein the rotation shaft is provided to be axially movable relative to the base bracket and the restriction portion is fixed to the rotation shaft to be axially unmovable relative to the rotation shaft, and wherein the rotation shaft is supported by the base bracket via a thread engagement portion and the operation portion includes an operation member provided at the rotation shaft for rotating the rotation shaft.

2. The ottoman device according to claim 1, wherein at least one of the engagement portions formed at the facing surfaces of the rotation link and the base bracket includes plural engagement portions at intervals in a circumferential direction at peripheral edges of the facing surfaces of the base bracket and the first rotation link.

3. The ottoman device according to claim 2, wherein each of the engagement portions includes a concavo-convex portion in a wavy form formed around the rotation shaft.

4. The ottoman device according to claim 2, wherein one of the facing surfaces is formed by a first engagement projection portion including a first inclined surface and a second inclined surface inclined in opposite directions from each other relative to a peak portion, and an other of the facing surfaces is formed by a second engagement projection portion being contactable and engageable with one of the first inclined surface and the second inclined surface of the first engagement projection portion depending on a rotation direction of the rotation link.

5. The ottoman device according to claim 2, wherein the restriction portion is rotatable relative to the rotation link, and a rolling member is disposed between the rotation link and the restriction portion.

6. The ottoman device according to claim 1, wherein each of the engagement portions includes a concavo-convex portion in a wavy form formed around the rotation shaft.

7. The ottoman device according to claim 6, wherein the restriction portion is rotatable relative to the rotation link, and a rolling member is disposed between the rotation link and the restriction portion.

8. The ottoman device according to claim 1, wherein one of the facing surfaces is formed by a first engagement projection portion including a first inclined surface and a second inclined surface inclined in opposite directions from each other relative to a peak portion, and an other of the facing surfaces is formed by a second engagement projection portion being contactable and engageable with one of the first inclined surface and the second inclined surface of the first engagement projection portion depending on a rotation direction of the rotation link.

9. The ottoman device according to claim 8, wherein the restriction portion is rotatable relative to the rotation link, and a rolling member is disposed between the rotation link and the restriction portion.

10. The ottoman device according to claim 1, wherein the thread engagement portion is configured to be inhibited from converting an axial movement of the rotation shaft into a rotation of the rotation shaft.

11. The ottoman device according to claim 1, wherein the restriction portion is rotatable relative to the rotation link, and a rolling member is disposed between the rotation link and the restriction portion.

* * * * *